United States Patent [19]
Liu et al.

[11] Patent Number: 6,018,526
[45] Date of Patent: Jan. 25, 2000

[54] BRIDGE DEVICE WITH SELF LEARNING BETWEEN NETWORK MEDIA AND INTEGRATED CIRCUIT AND METHOD BASED ON THE SAME

[75] Inventors: Chang-Chi Liu; Yu Liao, both of Fremont; Keith Wa Chau, San Jose, all of Calif.

[73] Assignee: Macronix America, Inc., San Jose, Calif.

[21] Appl. No.: 08/803,116

[22] Filed: Feb. 20, 1997

[51] Int. Cl.⁷ .................................................. H04L 12/46
[52] U.S. Cl. ............................................................ 370/401
[58] Field of Search ................................... 370/392, 400, 370/401, 402, 403, 465, 475

[56] References Cited

U.S. PATENT DOCUMENTS

| | | |
|---|---|---|
| 5,136,580 | 8/1992 | Videlock et al. . |
| 5,245,606 | 9/1993 | DeSouza . |
| 5,247,620 | 9/1993 | Fukuzawa et al. . |
| 5,307,345 | 4/1994 | Lozowick et al. . |
| 5,329,618 | 7/1994 | Moati et al. . |
| 5,374,926 | 12/1994 | Szczepanek . |
| 5,428,615 | 6/1995 | Backes et al. . |
| 5,477,547 | 12/1995 | Sugiyama . |
| 5,481,540 | 1/1996 | Huang . |
| 5,504,746 | 4/1996 | Meier . |
| 5,633,865 | 5/1997 | Short .................................. 370/401 |
| 5,638,515 | 6/1997 | Futral .................................. 370/402 |
| 5,740,171 | 4/1998 | Mazzola et al. .................... 370/401 |
| 5,757,795 | 5/1998 | Schnell ................................ 370/401 |
| 5,764,895 | 6/1998 | Chung ................................. 370/402 |

FOREIGN PATENT DOCUMENTS

| | | |
|---|---|---|
| 0 365 337 A3 | 10/1989 | European Pat. Off. . |
| 0 365 337 A2 | 4/1990 | European Pat. Off. . |
| 0 365 337 B1 | 4/1990 | European Pat. Off. . |
| 0 500 987 A1 | 2/1991 | European Pat. Off. . |
| 0 500 987 B1 | 2/1991 | European Pat. Off. . |
| WO 93/07691 | 4/1993 | WIPO . |

*Primary Examiner*—Min Jung
*Attorney, Agent, or Firm*—Haynes & Beffel LLP

[57] ABSTRACT

A device for coupling a first network medium to a second network medium. A first port is coupled to the first network medium and a second port coupled to the second network medium. A memory stores a first plurality of indications and a second plurality of indications. The indications in the first plurality of indications correspond to respective sets of addresses and indicate whether at least one address in the respective set of addresses may be accessible through the first network medium. The indications in the second plurality of indications correspond to respective sets of addresses and indicate whether at least one address in the respective set of addresses may accessible through the second network medium. A connecting circuit is coupled to the first port, the second port, and the memory. The connecting circuit causes the ports to pass or block a packet from the first network to the second network. The packet has a destination address. The connecting circuit causes the ports to pass or block based on a first indication from the first plurality of indications and a second indication from the second plurality of indications. The first indication corresponds to a set of addresses including the destination address of the packet. The second indication corresponds to the set of addresses including the destination address of the packet.

49 Claims, 21 Drawing Sheets

X = 0 OR 1

(1= PASS TO B)

A → B

| A0 | A1 | STAT A | B0 | B1 | STAT B | EN |
|----|----|--------|----|----|--------|-----|
| 0  | 0  | 0      | X  | X  | X      | 1   |
| 1  | X  | X      | 0  | 0  | 0      | 0   |
| X  | 1  | X      | 0  | 0  | 0      | 0   |
| X  | X  | 1      | 0  | 0  | 0      | 0   |
| X  | X  | X      | 1  | X  | X      | 1   |
| X  | X  | X      | X  | 1  | X      | 1   |
| X  | X  | X      | X  | X  | 1      | 1   |

(1= PASS TO A)

B → A

| B0 | B1 | STAT B | A0 | A1 | STAT A | EN |
|----|----|--------|----|----|--------|-----|
| 0  | 0  | 0      | X  | X  | X      | 1   |
| 1  | X  | X      | 0  | 0  | 0      | 0   |
| X  | 1  | X      | 0  | 0  | 0      | 0   |
| X  | X  | 1      | 0  | 0  | 0      | 0   |
| X  | X  | X      | 1  | X  | X      | 1   |
| X  | X  | X      | X  | 1  | X      | 1   |
| X  | X  | X      | X  | X  | 1      | 1   |

FIG. 7

| | B | M | S | IB | IM | H | PACKETS TO BE BLOCKED |
|---|---|---|---|---|---|---|---|
| 1 | 0 | 0 | 0 | 0 | 0 | 0 | NONE |
| 2 | 0 | 0 | 0 | 0 | 0 | 1 | STATIC HASHED-FILTERED PACKETS EXCEPT BROADCAST / MULTICAST PACKETS |
| 3 | 1 | 0 | 0 | 0 | 0 | 0 | BROADCAST PACKETS |
| 4 | 1 | 0 | 0 | 0 | 0 | 1 | BROADCAST AND STATIC HASH-FILTERED PACKETS |
| 5 | 0 | 1 | 0 | 0 | 0 | 0 | MULTICAST (BUT NOT BROADCAST) PACKETS |
| 6 | 0 | 1 | 0 | 0 | 0 | 1 | MULTICAST (BUT NOT BROADCAST) AND STATIC HASH-FILTERED PACKETS |
| 7 | 0 | 0 | 1 | 0 | 0 | 0 | SELF-ADDRESSING PACKETS |
| 8 | 0 | 0 | 1 | 0 | 0 | 1 | SELF-ADDRESSING AND STATIC HASH-FILTERED PACKETS |
| 9 | 1 | 1 | 0 | 0 | 0 | 0 | BROADCAST AND MULTICAST PACKETS |
| 10 | 1 | 1 | 0 | 0 | 0 | 1 | BROADCAST, MULTICAST AND STATIC HASH-FILTERED PACKETS |
| 11 | 1 | 0 | 1 | 0 | 0 | 0 | BROADCAST AND SELF-ADDRESSING PACKETS |
| 12 | 1 | 0 | 1 | 0 | 0 | 1 | BROADCAST, SELF-ADDRESSING AND STATIC HASH-FILTERED PACKETS |
| 13 | 0 | 1 | 1 | 0 | 0 | 0 | MULTICAST (BUT NOT BROADCAST), SELF ADDRESSING PACKETS |
| 14 | 0 | 1 | 1 | 0 | 0 | 1 | MULTICAST (BUT NOT BROADCAST), SELF-ADDRESSING & STATIC HASH-FILTERED PACKETS |
| 15 | 1 | 1 | 1 | 0 | 0 | 0 | BROADCAST, MULTICAST, AND SELF-ADDRESSING PACKETS |
| 16 | 1 | 1 | 1 | 0 | 0 | 1 | BROADCAST, MULTICAST, SELF-ADDRESSING AND STATIC HASH FILTERED PACKETS |
| 17 | X | X | X | 1 | 0 | X | PACKETS WITH DA != FFFFFFFFFFFF |
| 18 | X | X | X | 0 | 1 | X | BROADCAST AND PACKETS WITH THE FIRST BIT OF DA != 1 |
| 19 | X | X | X | 1 | 1 | X | PACKETS WITH THE FIRST BIT OF DA != 1 |

NOTE: B: BROADCAST PACKET FILTER;  M: MULTICAST PACKET FILTER;  S: SELF-ADDRESSING PACKET FILTER  IM: INVERSE MULTICAST PACKET
H: 256-BIT HASH FILTER;   IB: INVERSE BROADCAST FILTER

FIG. 11

BRIDGE DEVICE WITH SELF LEARNING BETWEEN NETWORK MEDIA AND INTEGRATED CIRCUIT AND METHOD BASED ON THE SAME

BACKGROUND OF THE INVENTION

1. Field of the Invention

The present invention relates to the field of devices for interconnecting networks; and more particularly to bridge devices with self learning for interconnecting networks.

2. Description of Related Art

Increasingly, local area networks (LANs) are being used in computing applications. One type of LAN protocol is the Ethernet protocol. In the Ethernet protocol, a network is divided into various segments or "collision domains." Each network segment consists of multiple nodes. A node is a device on a network such as a terminal or a printer. The distance at which nodes in a segment can be located from other nodes is limited. For example, in "Fast Ethernet" within a segment may allow nodes to only be as far apart as 205 meters.

Two segments can be connected through a bridge device. The bridge isolates a collision domain so that a collision that occurs in one segment does not affect another segment. Once the collision domains of two segments are separated by a bridge, two nodes can be farther apart than they could have been had they been in the same collision domain.

Besides segmentation, another bridge function is filtering. The purpose of filtering is to block unwanted traffic of information from entering another segment and wasting bandwidth. A bridge passes information from one segment to another segment in the form of packets. Based on various criteria, a bridge does not forward some of the packets it receives. For example, a bridge and method for accessing data in a table and its application to the routing of data between remote stations is described in a patent application by Marshall, European Publication Number 0,365,337,A2, (application number 89310789.6) published Apr. 25, 1990. For example, inter-LAN connection equipment is described in U.S. Pat. No. 5,477,547 (Sugiyama).

One criterion is that if a packet is headed for another node within the same segment (local traffic), preferably the bridge should not forward the packet into another segment. To do this the bridge needs information as to whether particular nodes reside in particular segments. One way a bridge can obtain this information is by observing the source addresses of packets from each segment and storing the source addresses from packets from one segment in a source address table. When a packet arrives, a CPU has to search a table of many entries and compare the destination address with each of them. Alternatively, also using a CPU, the search and compare function may be performed with content addressable memory (CAM). Using a CAM requires extra hardware (the CAM) and is difficult or impossible to scale for networks having gigabyte per second speeds. An FDDI Bridge Frame Learning and Filtering Apparatus and Method where a source address is stored in a CAM is described in U.S. Pat. No. 5,481,540 (Gang).

Accordingly there is a need for efficient and lower cost searching in a bridge to determine whether a packet should be forwarded to another network segment.

If a bridge learns the location of nodes by storing information in tables, then the tables may no longer be accurate if nodes are subsequently moved. There is therefore a need for an apparatus and method to update the table in a bridge so that the tables reflect a more recent view of the location of nodes.

A table with information regarding source addresses may be indexed by means of a hash function. A hash function may be employed to index entries in a table for addresses. However, a problem with hash functions is that two addresses may map into the same hash value. For example, A Bridge Apparatus with an Address Check Circuit for Interconnecting Networks in which hashing is used is described in U.S. Pat. No. 5,247,620 (Fukuzawa).

Accordingly, there is a need for a device that helps to reduce the complexity and costs associated with a bridge and helps to more efficiently provide the functionality of interconnection between network media and helps to avoid leaks of local packets to other network segments and is scalable for higher speed networks.

SUMMARY OF THE INVENTION

The present invention provides a device for coupling a first network medium to a second network medium. A first port is coupled to the first network medium and a second port coupled to the second network medium. A memory stores a first plurality of indications and a second plurality of indications. The indications in the first plurality of indications correspond to respective sets of addresses and indicate whether at least one address in the respective set of addresses may be accessible through the first network medium. The indications in the second plurality of indications correspond to respective sets of addresses and indicate whether at least one address in the respective set of addresses may accessible through the second network medium. A connecting circuit is coupled to the first port, the second port, and the memory. The connecting circuit causes the ports to pass or block a packet from the first network to the second network. The packet has a destination address. The connecting circuit causes the ports to pass or block based on a first indication from the first plurality of indications and a second indication from the second plurality of indications. The first indication corresponds to a set of addresses including the destination address of the packet. The second indication corresponds to the set of addresses including the destination address of the packet.

An embodiment of the present invention includes a first circuit that reads a source address of the packet. The first circuit sets a third indication in the first plurality of indications, the indication corresponding to the source address of the packet. A second circuit reads a source address of a second packet from the second port. The second circuit sets a fourth indication in the second plurality of indications. The fourth indication corresponds to the source address of the second packet.

An embodiment of the present invention includes a central processing unit (CPU) interface coupled to the memory that allows a CPU to set indications in the memory.

An embodiment of the present invention includes an erase circuit coupled to the memory that erases old entries from the memory.

An embodiment of the present invention includes an aging timer and an erase circuit coupled to the aging timer and the memory. In this embodiment of the invention the first plurality of indications comprises a third plurality of indications and a fourth plurality of indications. The first circuit is configured to set the third indication in the third plurality of indications or in the fourth plurality of indications based on the aging timer. The erase circuit is configured to erase the third plurality of indications or the fourth plurality of indications based on the aging timer.

In an embodiment of the invention the connecting circuit is configured to block the packet from the first network segment to the second network segment if:

the first indication indicates that at least one address in the second set of addresses may be accessible through the first network medium; and the second indication does not indicate that at least one address in the fourth set of addresses may be accessible through the second network medium.

In an alternative embodiment of the present invention the connecting circuit is configured to pass the packet from the first network segment to the second network segment if the second indication indicates that the destination address of the packet may be accessible through the second network segment.

An alternative embodiment of the present invention includes an index generation circuit that generates a first index in response to the destination address of the packet and a selector circuit that selects the first indication from the first plurality of indications based on the first index. The selector circuit is coupled to the connecting circuit and to the index generation circuit. In an alternative embodiment of the invention the index generation circuit comprises a hash circuit and the first index comprises a result of a hash function of the destination address of the packet.

In an alternative embodiment of the invention the respective sets of addresses comprise medium access control (MAC) addresses.

In an alternative embodiment of the invention the first network medium comprises a network using carrier sense multiple access protocol. In another embodiment of the invention, the first network medium comprises a collision domain network segment.

An alternative embodiment is a medium access control (MAC) layer device for coupling a first network medium to a second network medium. A first port is coupled to the first network medium. A second port coupled to the second network medium. A memory has a first table and a second table. A first circuitry monitor first packets from the first port and sets entries in the first table in response to the first packets. The entries in the first table are indexed based on source addresses of the first packets from the first port. At least one entry in the first table maps to more than one address. A second circuitry monitors second packets from the second port and sets entries in the second table in response to the second packets. The entries in the second table are indexed based on source addresses of the second packets from the second port. A third circuitry selects a first entry from the first table and a second entry from the second table based on a destination address of a first packet from the first port. The source addresses of first packets from the first port comprise MAC addresses, and the source addresses of second packets from the second port comprise MAC addresses. The third circuitry passes the first packet from the first port to the second port if:

the first entry is not set, or both the first entry and the second entry are set.

The invention helps to provide a cost-effective solution to link fast Ethernet repeaters together so that the distance between nodes can be expanded beyond the collision domain limitation. Flexibility is achieved by designing collision domain networks that are joined by bridges. Self-learning helps to eliminate the need for programming the device. A learning and filtering method helps to avoid the need for specialized CAM hardware.

Other aspects and advantages to the present invention can be seen upon review of the figures, the detailed description and the claims which follow.

BRIEF DESCRIPTION OF THE FIGURES

FIG. 7 illustrates pass through rules according to the present invention.

FIG. 11 is a chart illustrating filtering functions according to the present invention.

DETAILED DESCRIPTION

A detailed description of the preferred embodiments of the present invention is provided with reference to the figures.

Figure 1:
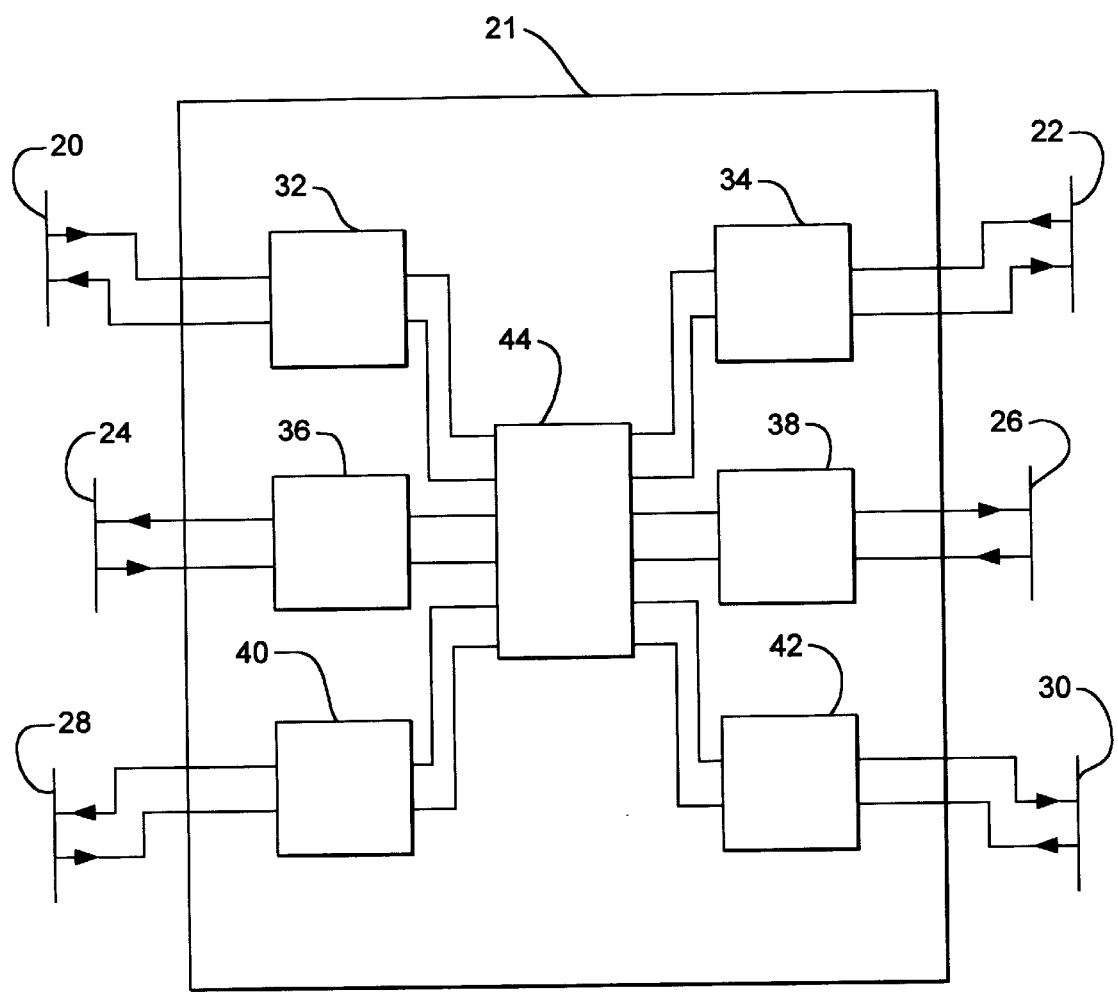
FIG. 1 is a schematic block diagram of network segments and a bridge device of the present invention.

FIG. 1 illustrates the architecture of an embodiment of the present invention and a context for use of the present invention. Segments 20, 22, 24, 26, 28, and 30 are interconnected via bridge device 21. Bridge device 21 receives information from the segments 20, 22, 24, 26, 28, and 30 and determines whether to pass the information to other segments. Packets are sent to local addresses (within the segment from which the packet originated) or to non-local addresses (outside the segment from which the packet originated). Bridge 21 helps to block packets that are destined to local addresses and pass packets that are destined to non-local addresses. Filter 44 selectively blocks or passes packets from one network segment to another.

By observing source addresses of packets received on various ports 32, 34, 36, 38, 40, and 42, bridge device 21 learns which network segments are associated with the addresses. When bridge device 21 receives a new packet, bridge device 21 updates its knowledge of the location of the address associated with the source address of the packet and also decides whether to forward the packet based on the destination address of the packet.

FIG. 1 shows a bridge which interconnects a total of six network segments (20, 24, 28, 22, 26 and 30). An alternative embodiments bridge 21 could be implemented to interconnect another number of network segments. For example, bridge 21 could be designed to interconnect a total of two network segments. In one preferred embodiment, bridge 21 includes a simple integrated circuit including control circuitry for connecting two network segments.

Figure 2:
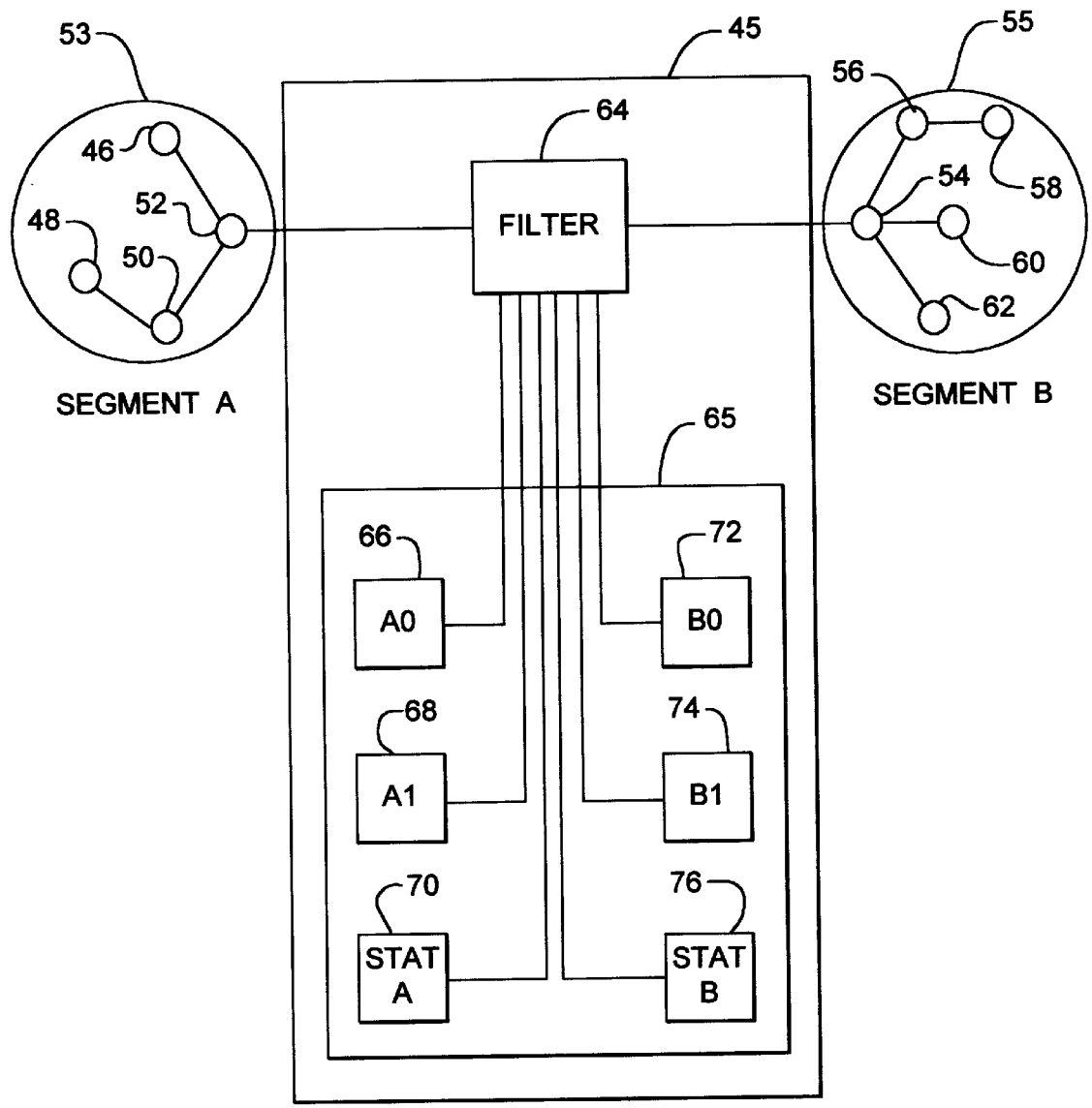
FIG. 2 is a schematic block diagram of a bridge device showing blocks for passing packets according to the present invention.

FIG. 2 is a schematic block diagram of a bridge device showing blocks for passing packets according to the present invention. FIG. 2 includes a network segment A 53 including network nodes 46, 48, 50 and 52, a second network segment B 55 including network nodes 54, 56, 58, 60 and 62, and a bridge device 45 interconnecting network segments 53 and 55. Bridge device 45 includes filter 64 and a memory 65 comprising dynamic table A0 66, dynamic table A1 68, static table A 70, dynamic table B0 72, dynamic table B1 74, static table B 76. Bridge device 45 is coupled to network segment 53 and network segment 55.

Filter 64 determines whether to pass packets from network segment A 53 to network segment B 55 based on information contained in dynamic table A0, 66, dynamic table A1 68, static table, A 70, dynamic table B0 72, dynamic table B1 74, and static table B 76. The tables contain indications of whether a node exists on a particular side of the bridge. Since the indications are indexed based on hash value, there is the possibility that two different addresses may map to the same hash value. Because of this possibility, if a positive indication is found on a side A table corresponding to an address of a packet from network segment A, the filter will also check side B tables.

Figure 3:
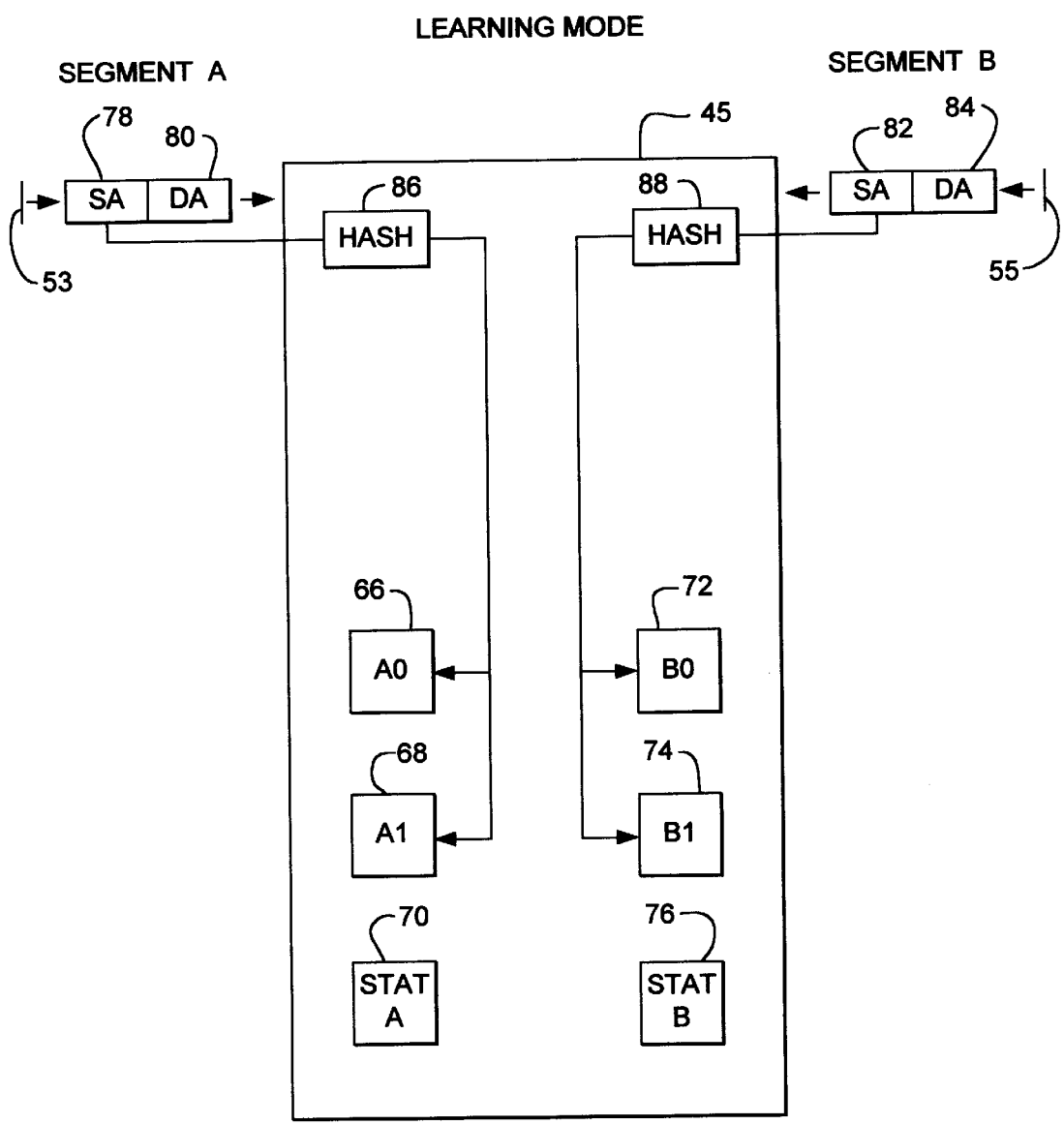
FIG. 3 is a schematic block diagram of a bridge device showing blocks for learning according to the present invention.

FIG. 3 is a schematic block diagram of a of a bridge device 45 for learning according to the present invention. FIG. 3 shows a packet from segment A, including a source address 78 and a destination address 80 and a packet from segment B, including a source address 82 and destination address 84. Bridge 45 includes hash circuit 86, dynamic table A0 66, dynamic table A1 68, static table A 70, hash circuit 88, dynamic table B0 72, dynamic table B1 74, and static table B 76.

When bridge device 45 learns addresses, indications corresponding to source addresses of packets are stored in tables associated with the network segment from which the packets originated. Source address 78 is hashed by hash circuit 86 to create a hash value, and an indication is stored indexed by the hash value in either table A0 66 or table A1 68. Source address 82 from segment B 55 is hashed by hash circuit 88 to create a hash value, and an indication is stored in either table B0 72 or B1 74, indexed by the hash value. The use of multiple dynamic tables on each side of bridge 45 allows for the aging and flushing of old entries of the table. For example, new indications may be stored in dynamic table A0 66, while old indications may have been stored in dynamic table A1 68. After a period of time (e.g., 5 minutes), old entries from table A1 68 are erased and then dynamic table A0 68 becomes the old table and new entries are written into dynamic table A1 68. Similarly, dynamic table B0 72 and dynamic table B1 74 are used in conjunction in order to allow for the aging of indications and for the erasing of old indications. Static table A 70 and static table B 76 are written by a CPU in order to provide indications of whether nodes exist on a particular side of the bridge when those network nodes do not normally broadcast their presence so that their presence may not be recorded in the dynamic tables.

Figure 4:
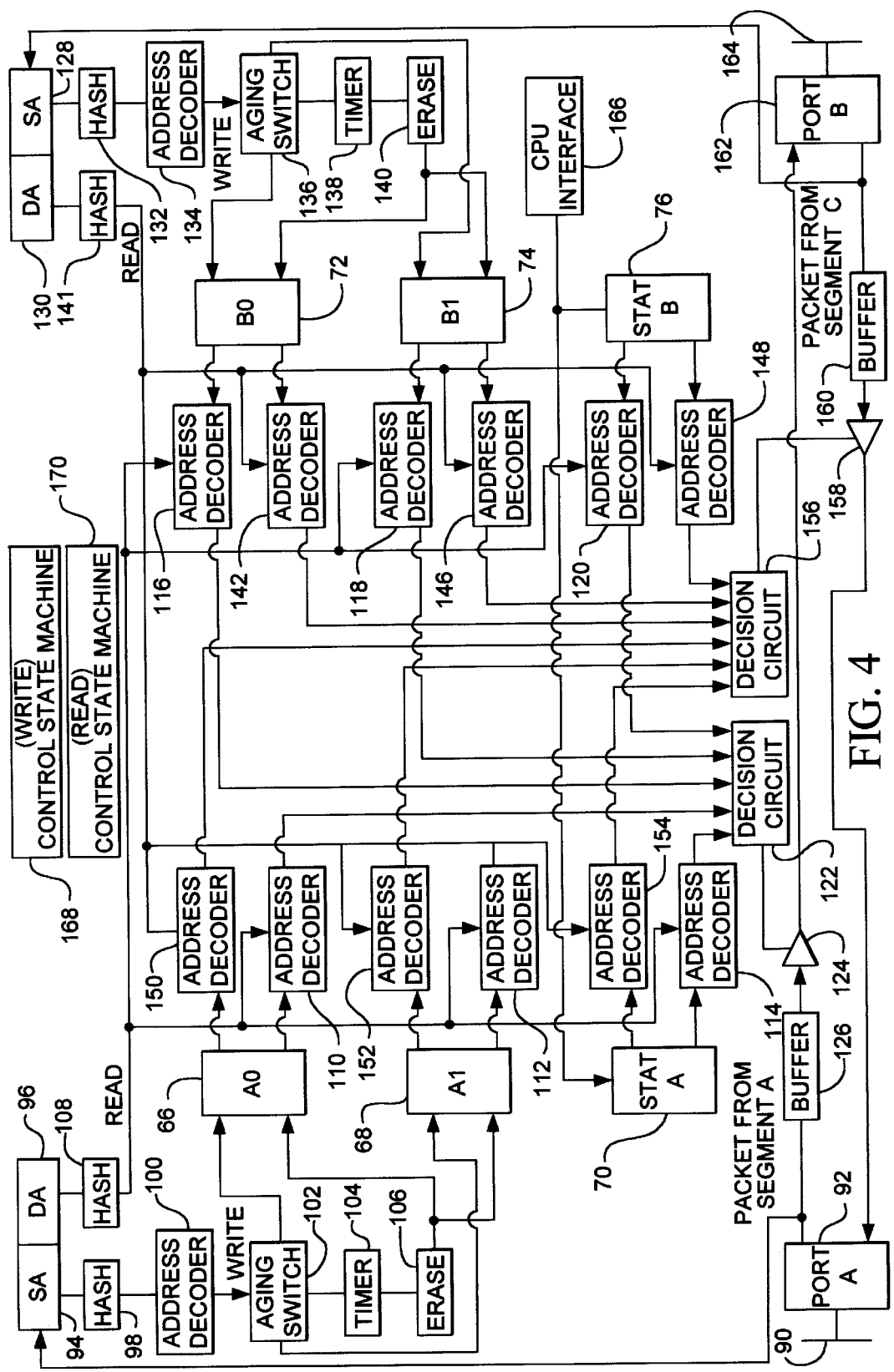
FIG. 4 is a more detailed block diagram of a bridge device according to the present invention.

FIG. 4 is a more detailed block diagram of a bridge device according to the present invention. FIG. 4 includes a source address 94 from segment A 90, a destination address 96 from segment A 90, a source address 128 from segment B 164, a destination address 130 from segment B 164, and supporting circuitry for filtering packets originating from segment A 90 or from segment B 164.

Port 92 is coupled to network segment A 90 and receives packets from segment A 90. Port 92 is coupled to buffer 126 for storing packets. Port 92 provides a source address 94 to hash circuit 98. Source address 94, destination address 96, destination address 130, and source address 128 are each 6 byte MAC level addresses. Hash circuit 98 provides an 8-bit hash value in response to the 6 byte source address 94. Hash circuit 98 is coupled to address decoder 100. Address decoder 100 is coupled to dynamic table A0 66 and dynamic table A1 68 through aging switch 102. Dynamic tables A0 66 and dynamic tables A1 68 store indications indexed by the hash values generated by hash circuit 98 to indicate that source addresses corresponding to the indications exist on network segment A 90. Aging switch 102 is coupled to timer 104 and controls in which table A0 66 or table A1 68 indications are stored. Erase circuit 106 is coupled to dynamic table A0 66 and dynamic table A1 68 and erases old entries in the dynamic tables based on timer 104.

Hash circuit 108 is coupled to port 92 and receives a destination address 96 from a packet from segment A 90 and hashes the destination address to form a hash value. The hash value from hash circuit 108 is used to index into hash tables and obtain indications corresponding to the hash value. Hash circuit 108 is coupled to address decoder 110, address decoder 112, address decoder 114, address decoder 116, address decoder 118, and address decoder 120. Address decoder 110 is coupled to dynamic table A0 66. Address decoder 112 is coupled to dynamic table A1 68. Address decoder 114 is coupled to static table A 70. Address decoder 116 is coupled to dynamic table B0 72. Address decoder 118 is coupled to dynamic table 174. Address decoder 120 is coupled to static table B 76. The inputs of decision circuit 122 are coupled to address decoder 110, address decoder 112, address decoder 114, address decoder 116, address decoder 118, and address decoder 120. The output of decision circuit 122 is coupled to the control of pass through switch 124. The input of pass through switch 124 is coupled to buffer 126. The output of pass through switch 124 is coupled to port 162, which is coupled to segment B 164.

Segment B 164 is coupled to port B 162. Hash circuit 132 receives a source address 128 from port 162. Hash circuit 132 is coupled to address decoder 134 and provides a hash value to address decoder 134. Address decoder 134 is coupled through aging switch 136 to dynamic table B0 72 and dynamic table B1 74 for writing indications into table B0 72 or table B1 74 indexed by the hash value from address decoder 134. Aging switch 136 is coupled to timer 138 and controls into which table indications are written depending on timer 138. Erase circuit 140 is coupled to dynamic table B0 72 and dynamic table B1 74 and erases old entries in respective tables. CPU interface 166 is coupled to a CPU and to static table A 70 and static table B 76 and allows a CPU to write entries into the static tables.

Hash circuit 141 is coupled to port 162 to receive destination address 130 and to provide a hash value in response to destination address 130. Hash circuit 141 is coupled to address decoder 142, address decoder 146, address decoder 148, address decoder 150, address decoder 152, and address decoder 154. Address decoder 142 is coupled to dynamic table B0 72. Address decoder 146 is coupled to dynamic table B1 74. Address decoder 148 is coupled to static table B 76. Address decoder 150 is coupled to dynamic table A0 66. Address decoder 152 is coupled to dynamic table A1 68. Address decoder 154 is coupled to static table A 70. The input of decision circuit 156 is coupled to address decoder 142, address decoder 146, address decoder 148, address decoder 150, address decoder 152, and address decoder 154. The output of decision circuit 156 is coupled to the control input of pass through circuit 158. Pass through circuit 158 is coupled to buffer 160 and to port 92.

Write control state machine 168 controls the operation of the bridge during the writing of indications corresponding to source addresses. Read control state machine 170 controls the reading of indications and the passing or blocking of packets from network segments.

When a new packet from segment A 90 arrives at port 92, the source address of the packet 94 is hashed to create an 8-bit hash value. A 1-bit indication is stored in one of the dynamic tables (dynamic table A0 66 or dynamic table A1 68). This 1-bit indication is indexed by the hash value that was obtained by hashing the source address of the packet. Each table contains 256 1-bit entries in order to provide entries corresponding to 256 possible hash values. Table A0 66 or table A1 68 are written alternatively as controlled by aging switch 102 depending on timer 104. In this manner, dynamic table A0 66 and dynamic table A1 68 alternate in the roles of active and historic tables. When the timer expires after 5 minutes, the table having the older entries (historic table) is erased by erase circuit 106. Then the historic table becomes the active table and entries are written into it for the next five minutes.

Similarly, the source address of a packet from network B is hashed to obtain a hash value and an indication (1 bit) is stored in either dynamic table B0 72 or dynamic table B1 74 to indicate that an address corresponding to the source address is present on side B. Also, dynamic table B0 72 and dynamic table B1 74 are used alternately for writing indications in order to provide for aging and erasing of old indications. Static table A 70 and static table B 76 provide for storing of indications corresponding to nodes that do not normally broadcast packets and thus ordinarily would not have corresponding indications in the dynamic tables. A CPU writes indications in static table A 70 and static table B 76 via a CPU interface 166. Decision circuit 122 controls whether packets pass from segment A 90 to segment B 164. Whether a packet is passed from segment A to segment B is determined by decision circuit 122 based on the indications stored in static tables and the dynamic tables. Similarly, whether a packet is passed from segment B to segment A is determined by decision circuit 156 based on indications in the static tables and the dynamic tables.

When a packet arrives from a network segment, indications are stored in the corresponding dynamic tables to indicate the source of that packet. The destination address of the packet is used to determine whether the packet should be forwarded to another network segment based on the indications in tables corresponding to the destination address.

Figure 5:
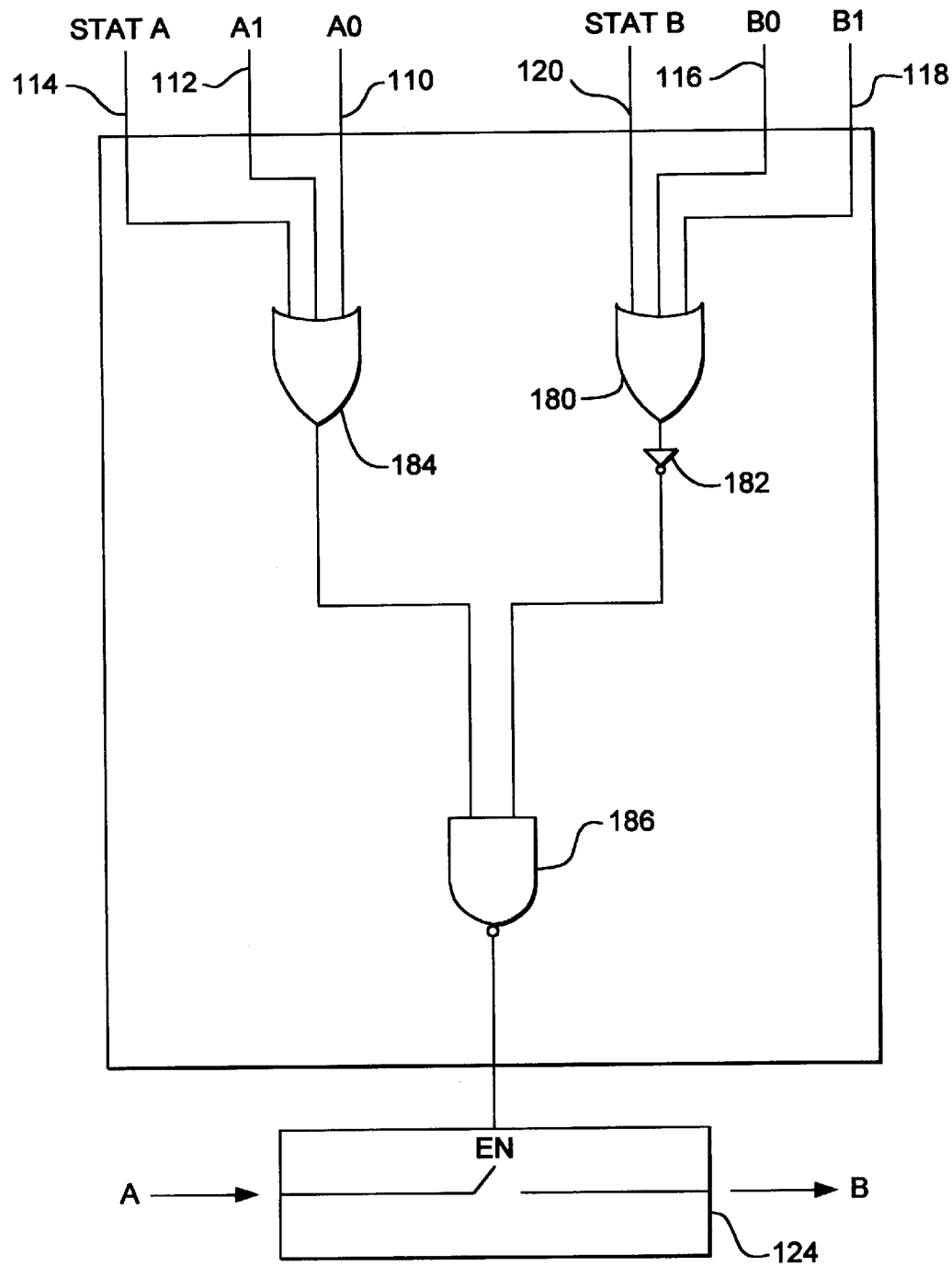
FIG. 5 is a circuit diagram of a decision circuit and a pass through circuit for packets from network A according to the present invention.

FIG. 5 is a circuit diagram of a decision circuit and a pass through circuit for packets from network A, according to the present invention. The input of OR gate 184 is coupled to static table A 70 via address decoder 114, to dynamic table A1 68 via address decoder 112, and to dynamic table A0 66 via address decoder 110. The input of OR gate 180 is coupled to static table B 76 via address decoder 120, to dynamic table B0 72 via address decoder 116, and to dynamic table B1 74 via address decoder 118. The output of OR gate 184 is coupled to the input of NAND gate 186. The output of OR gate 180 is coupled to the input of inverter 182. The output of inverter 182 is coupled to the input of NAND gate 186. The output of NAND gate 186 is coupled to the control of pass through circuit 124 such that pass through circuit will allow a packet to pass if an indication corresponding to the packet has been set in static table B 76, dynamic table B0 72, or dynamic table B1 74 and will allow a packet to pass if no corresponding indication is set in static table A 70, dynamic table A1 68, and dynamic table A0 66.

Figure 6:
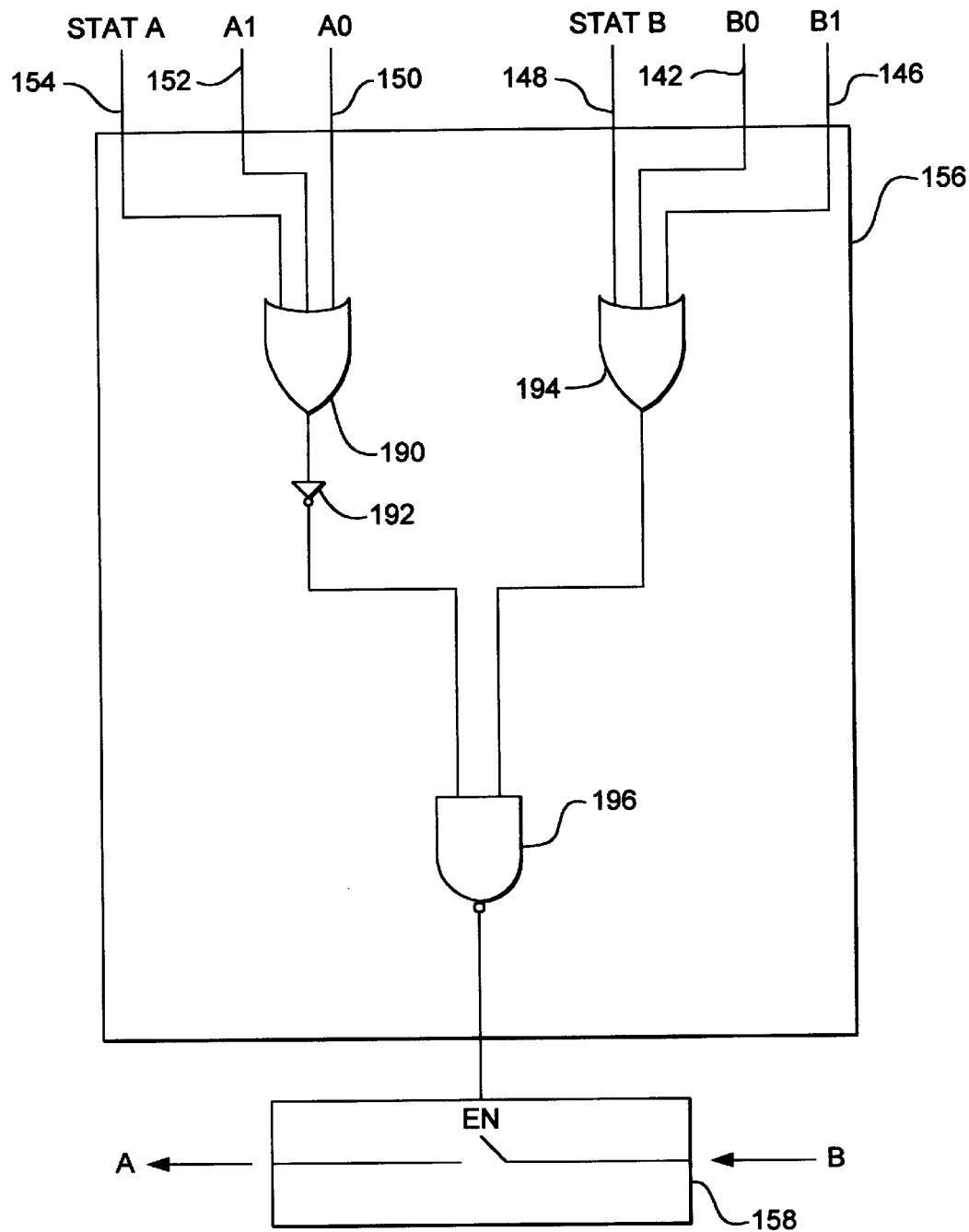
FIG. 6 is a circuit diagram of a decision circuit and a pass through circuit for packets from network B according to the present invention.

FIG. 6 is a circuit diagram of a decision circuit and pass through circuit for packets from network B, according to the present invention. The input of OR gate 190 is coupled to static table A 70 via address decoder 154, to dynamic table A1 68 via address decoder 152, and to dynamic table A0 66 via address decoder 150. The input of OR gate 194 is coupled to static table B 76 via address decoder 148, to dynamic table B0 74 via address decoder 142, and to dynamic table B1 74 via address decoder 146. The output of OR gate 190 is coupled to the input of inverter 192. The output of OR gate 194 is coupled to the input of NAND gate 196. The output of NAND gate 196 is coupled to the control of pass through circuit 158. Decision circuit 156 controls whether a packet will pass network segment B 164 to network segment A 90.

FIG. 7 illustrates the pass through rules according to the present invention. The number 0 represents that an indication has not been set for a particular table, for example, the first entry under A0 is 0. This represents that the corresponding indication is not currently set. The number 1 indicates that the corresponding indication is set. For example, the second entry under A0 is 1 and indicates that a corresponding entry of A0 is set. The letter "x" indicates that for that particular row that corresponding value signified with the "x" is irrelevant, and whether it is 0 or 1, the result will be the same. In the first row the chart shows pass through enabled, (as represented by 1 in the enable column EN) when the corresponding entry of A0 has not been set, A1 has not been set and static table A has not been set. For that particular state represented in the first row of the chart, the values of B0, B1, and static table B are irrelevant as represented by x's in the corresponding entries. Thus, a packet is passed from segment A to segment B if none of the tables corresponding to segment A nodes have been set with corresponding indications, and a packet is passed from segment A to segment B if any of the tables corresponding to segment B have been set with corresponding indications. The second half of FIG. 7 shows the rules for passing packets from segment B 164 to segment A 190.

Figure 8:
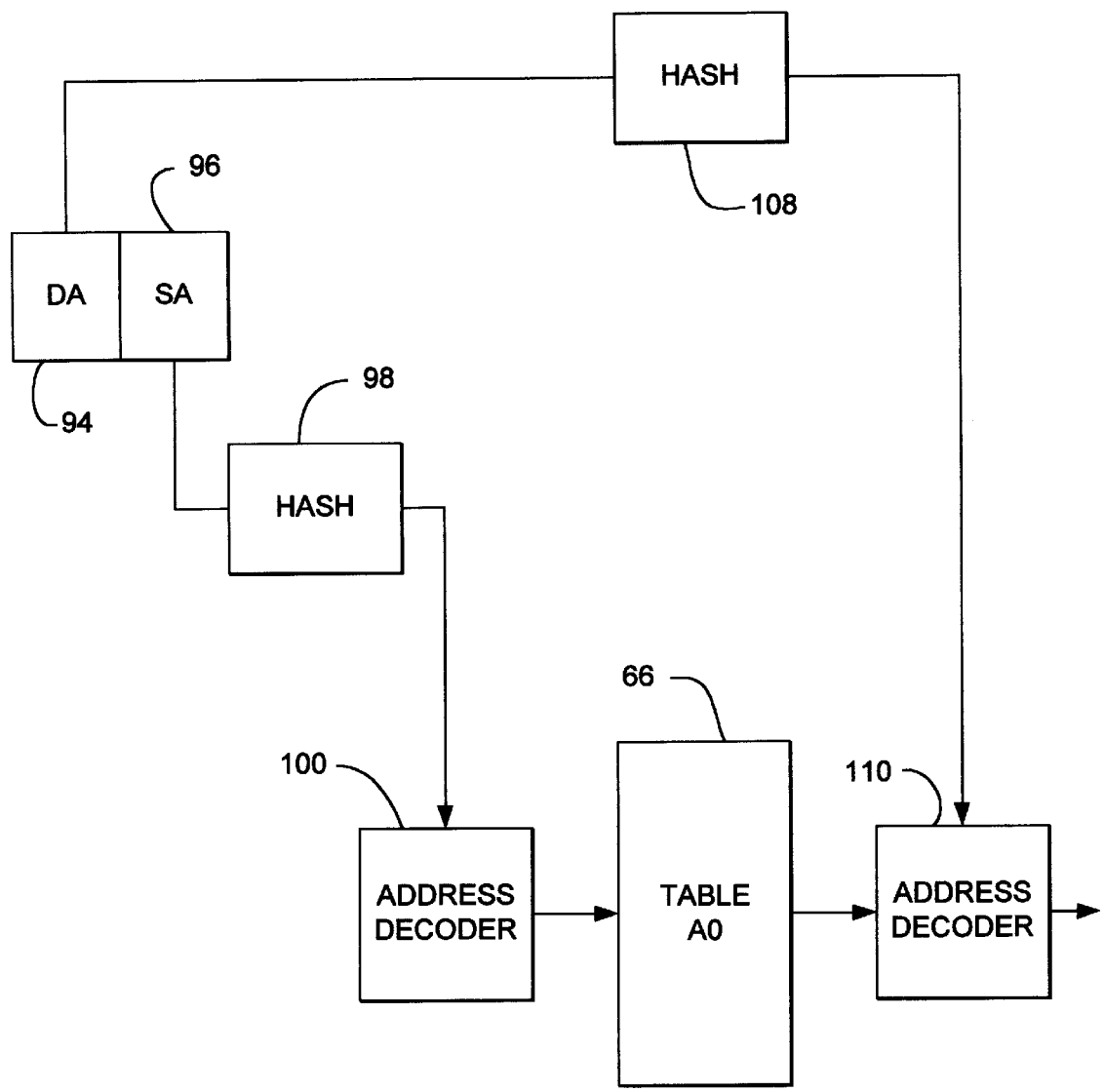
FIG. 8 is a block diagram of an entry store and select circuit with a table according to the present invention.

FIG. 8 is a block diagram of an entry store and select circuit with a table according to the present invention.

Address decoder 100 and address decoder 110 are each implemented as multiplexers. Hash circuit 98 hashes source address 96 to create a first hash value. The first hash value is used by address decoder 100 to write an entry in dynamic table A0 66. The entry that is written in dynamic table 66 is indexed by the first hash value provided by hash circuit 98. Destination address 94 is hashed by hash circuit 108 to create a second hash value. The second hash value is used by address decoder 110 in selecting an indication corresponding to the destination address 94 from dynamic table A0 66. Since a 6-byte address (MAC address) is used to hash into an 8-bit hash value, there is the possibility that a set of two or more addresses will hash to the same hash value. Thus, if the second hash value has been set, it may have been set in response to a packet having a source address equal to destination address 94, or it may have been set by a packet having a source address that is not equal to destination address 94 but hashes to the same 8-bit hash value.

Figure 9:
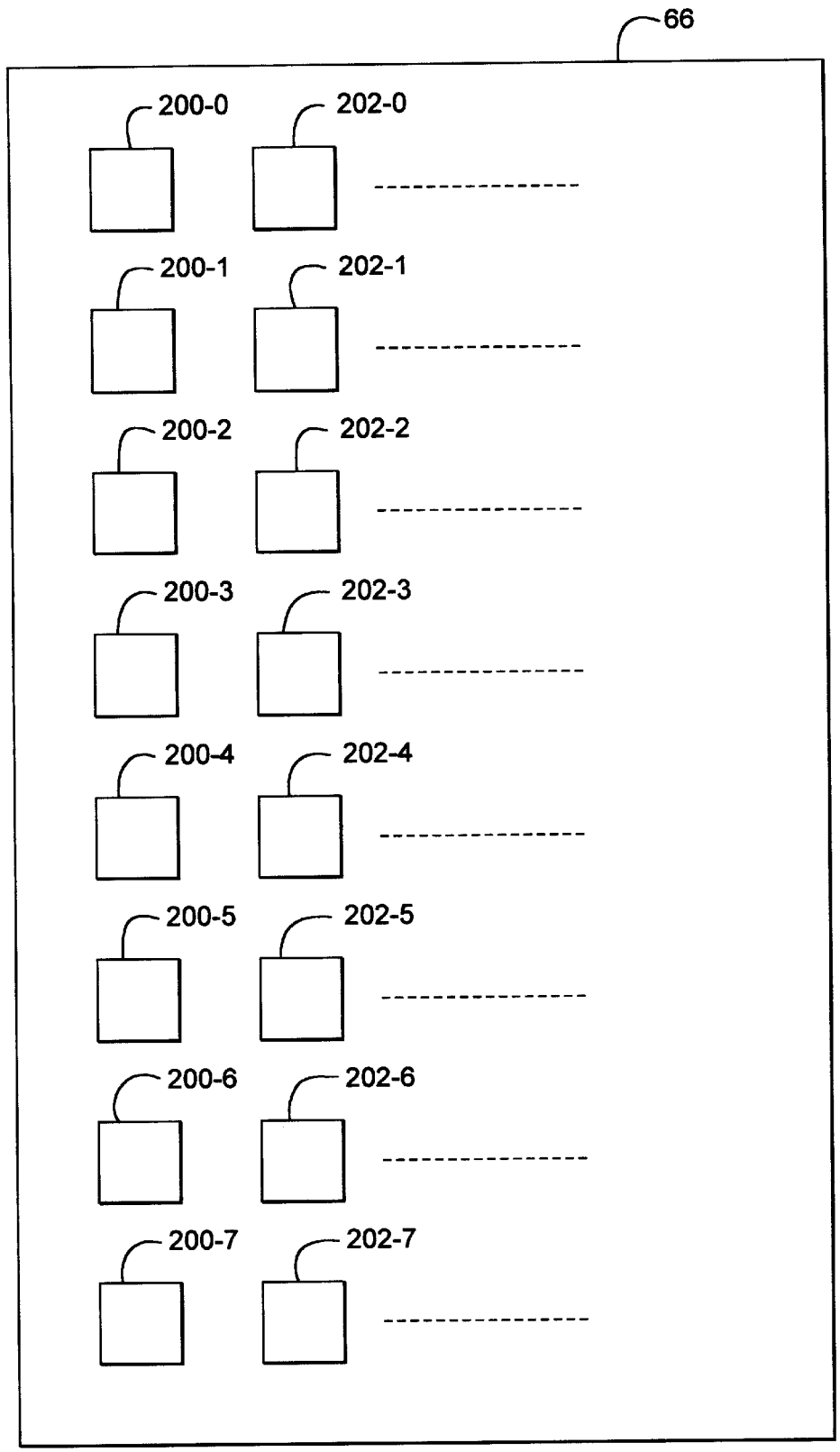
FIG. 9 is a block diagram of a table according to the present invention.

FIG. 9 is a block diagram of a table according to the present invention. Dynamic table A0 66 is constructed in a similar manner to other tables (dynamic table A1 68, dynamic table B0 72, dynamic table B1 74, static table A 70, and static table B 76) used by the bridge device. Table A0 66 is comprised of a total of 256 entries, each entry corresponding to an indication of whether at least one address in a set of addresses exists on a particular side of the bridge. Each indication among the 256 indications is stored as a 1-bit value. Each 1-bit value is stored by a single D flip flop, for example, flip flop 200-0. Thus, dynamic table A0 is comprised of flip flop 200-0 through flip flop 200-7, flip flop 202-0 through flip flop 202-7, and other flip flops comprising a total of 256 flip flops. Indications are written into table A0 66 by setting a flip flop at a location in table A0 66 indexed by a hash value generated by hash circuit 98 and as selected in table A0 66 by address decoder 100. Table A0 is erased by clearing all flip flops comprising table AO. The table is comprised of 32 8-bit registers. Each column shown in FIG. 9 comprises an 8-bit register, for example, the row comprised of flip flop 200-0 through flip flop 200-7. After reset, all tables are cleared to "0's" which means that all packets received on corresponding sides are forwarded. Static table entries are set and cleared by an external CPU. Dynamic tables are set and cleared during the learning and aging process.

Figure 10A:
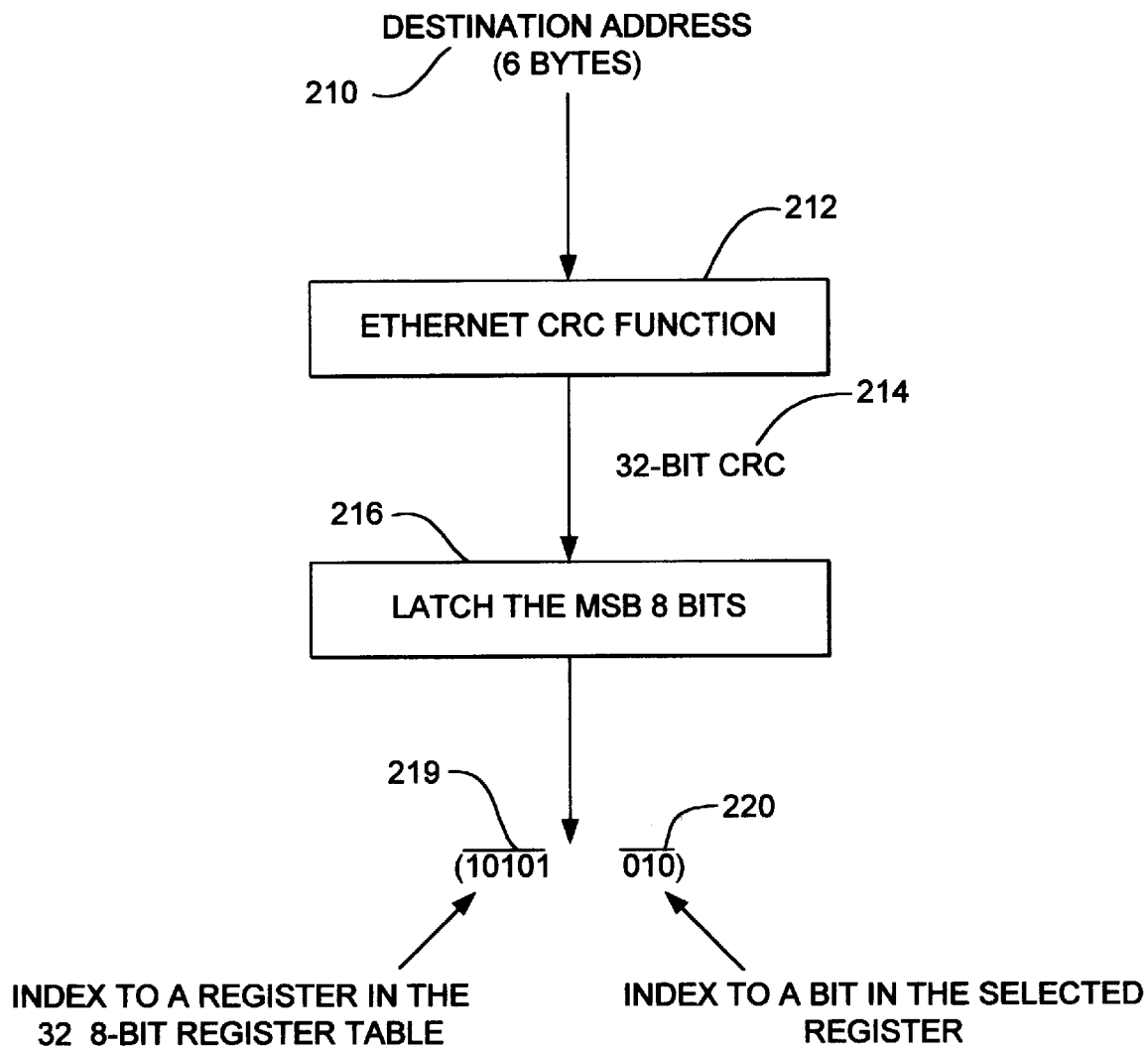
FIG. 10a is a block diagram of a hashing function.

FIG. 10a is a block diagram of a hashing function according to an embodiment of the present invention. The first six bytes of a destination address 210 of a non-multicast and non-broadcast packet are fed through the IEEE standard 802.3 Ethernet cyclic redundancy check (CRC) function (block 212). A 32-bit CRC value 214 results from the CRC function 212. The most significant 8 bits of the 32-bit CRC value 214 are latched (block 216). These 8 bits are decoded to index an indication (1 bit) in the table (e.g., dynamic table A0 66, dynamic table A1 68, dynamic table B0 72, or dynamic table B1 74). To decode, the least significant 5 bits (item 219) index into one register among the 32 registers of the table (e.g, dynamic table A0 216), and the most significant 3 bits (item 220) index to a bit in the selected register. In the example shown in FIG. 10a, the destination address is found to hash to register 21, bit 2. The hashing function is also used for hashing a source addresses to store indications stored in the tables and for hashing of destination addresses in order to obtain indications from the static tables (static table A 70 and static table B 76).

Figure 10B:
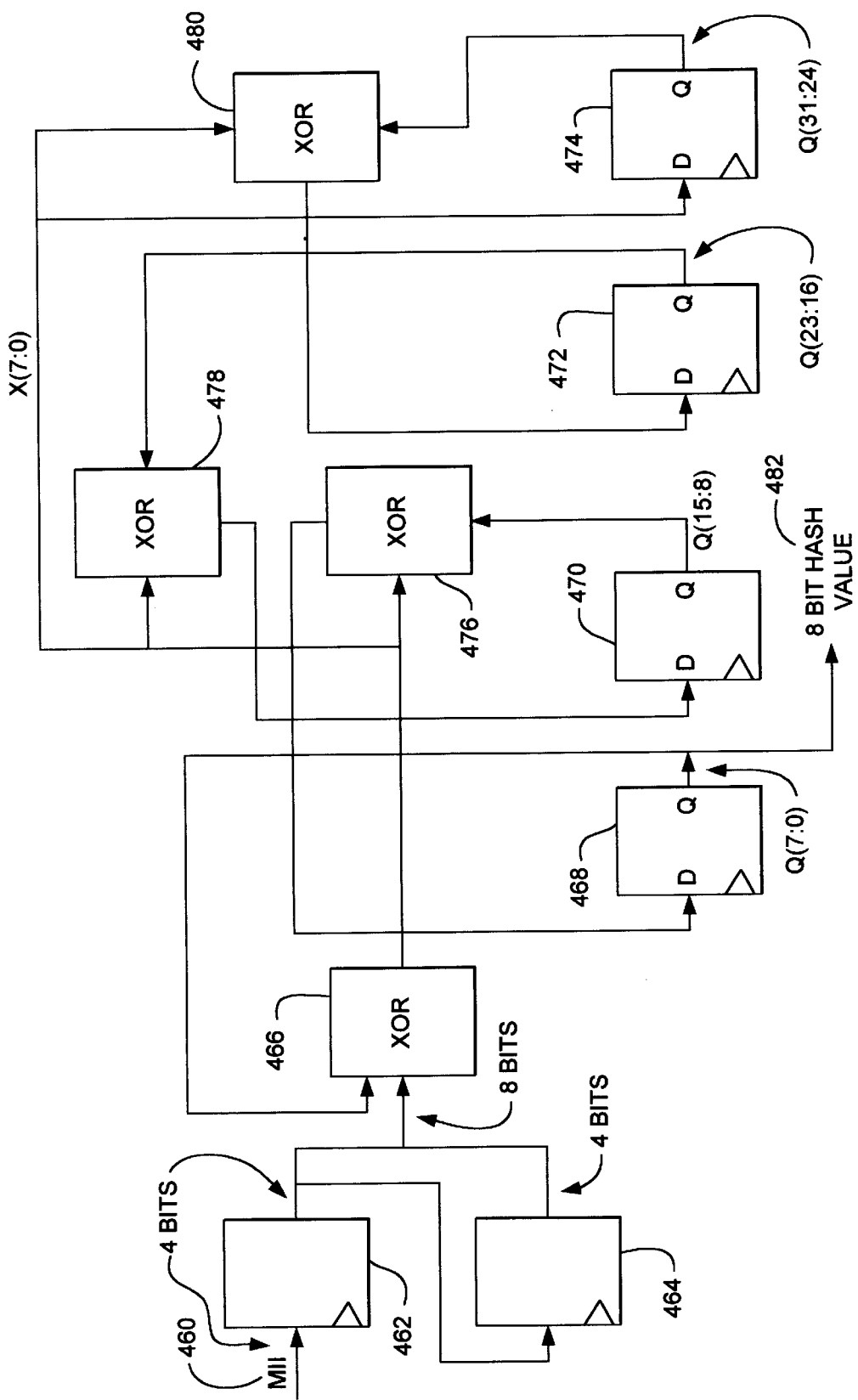
FIG. 10b is a block diagram of a cyclic redundancy check circuit.

FIG. 10b is a block diagram of a cyclic redundancy check (CRC) circuit. Address bits are obtained from media independent interface (MII) 460 and are processed by the CRC circuit to yield an 8-bit hash value 482. CRC circuit included register 462 and 464, exclusive OR logic (XOR) blocks 466, 476, 478, and 480, and D flip-flops 468, 470, 472, and 474.

Address bits from MII 460 are received by register 462. The output of register 462 is an 4-bit value and is coupled to the input of register 464 and to the input of XOR 466. The output of register 464 is a 4-bit value and is combined with the output from register 462 as an 8-bit input to XOR 466. The output of XOR 466 is coupled to the input of XOR 476, to the input of XOR 478, to the input of XOR 480, and to the input of D flip-flop 474. The output of XOR 476 is coupled is coupled to the input of D flip-flop 468. The output of D flip-flop 468 is coupled to the input of XOR 466 and as an 8-bit hash value 482. The output of XOR 478 is coupled to the input of D flip-flop 470. The output of D flip-flop 470 is coupled to input the input of XOR 476. The output of XOR 480 is coupled to the input of D flip-flop 472. The output of D flip-flop 472 is coupled to the input of XOR 478. The output of D flip-flop 474 is coupled to the input of XOR 480.

Although a CRC hashing function is described here, it is appreciated that other deterministic randomizing functions could be used to create index values by which to index indications in the tables. For a discussion of a cyclic redundancy check function, see An American Standard IEEE Standards for Local Area Networks: *ANSI/IEEE Std 802.3-1985 ISO Draft International Standard 8802/3: Carrier Sense Multiple Access with Collision Detection (CSMA/CD) Access Method and Physical Layer Specifications*, Technical Committee on Computer Communications of the IEEE Computer Society (Approved Jun. 24, 1983, IEEE Standards Board; Dec. 21, 1984 American National Standards Institute), which is incorporated herein by reference. See, in particular, section 3.2.8 ("Frame Check Sequence Field") of that document.

FIG. 11 is a chart illustrating filtering functions according to the present invention. In the cases of 1 through 16 where self-learning mode is selected, the number of packets that are blocked include those that are filtered by each individual case as well as those rejected by the self-learning tables. If an inverse filtering option is activated (case 17, 18, 19), only broadcast or multicast packet is forwarded and the rest of the packets are blocked regardless of the setting of filtering options. Broadcast Packet Filter: Packets with all "1's" in the 48-bit Destination Address are not forwarded. Multicast Packet filter: Packets with "1" in the Group Address bit are not forwarded; this does not include broadcast packets. Self-Addressing Packet (DA=SA) Filer: Packets with the same Destination and Source Addresses are not forwarded. Inverse Broadcast Filter: Only packets with all "1's" in the 48-bit Destination Address are forwarded. Inverse Multicast Packet Filter: Only packets with "1's" in the Group Address but not Broadcast address are forwarded.

256-bit Static Hash Filter: There are two static hash filter tables STATA and STATB. The destination address of a non-multicast/broadcast packet from Port A is hashed as described above to provide the corresponding bits in STATA and STATB. If the indexed bit in STATA is set to "1" and the corresponding bit in STATB is not set to "1", this packet is blocked from transmitting into Port B. If the indexed bit in STATA and the corresponding bit STATB are both set to "1", the packet is not blocked. Hash filtering from Port B to Port A works in the same way.

Figure 12:
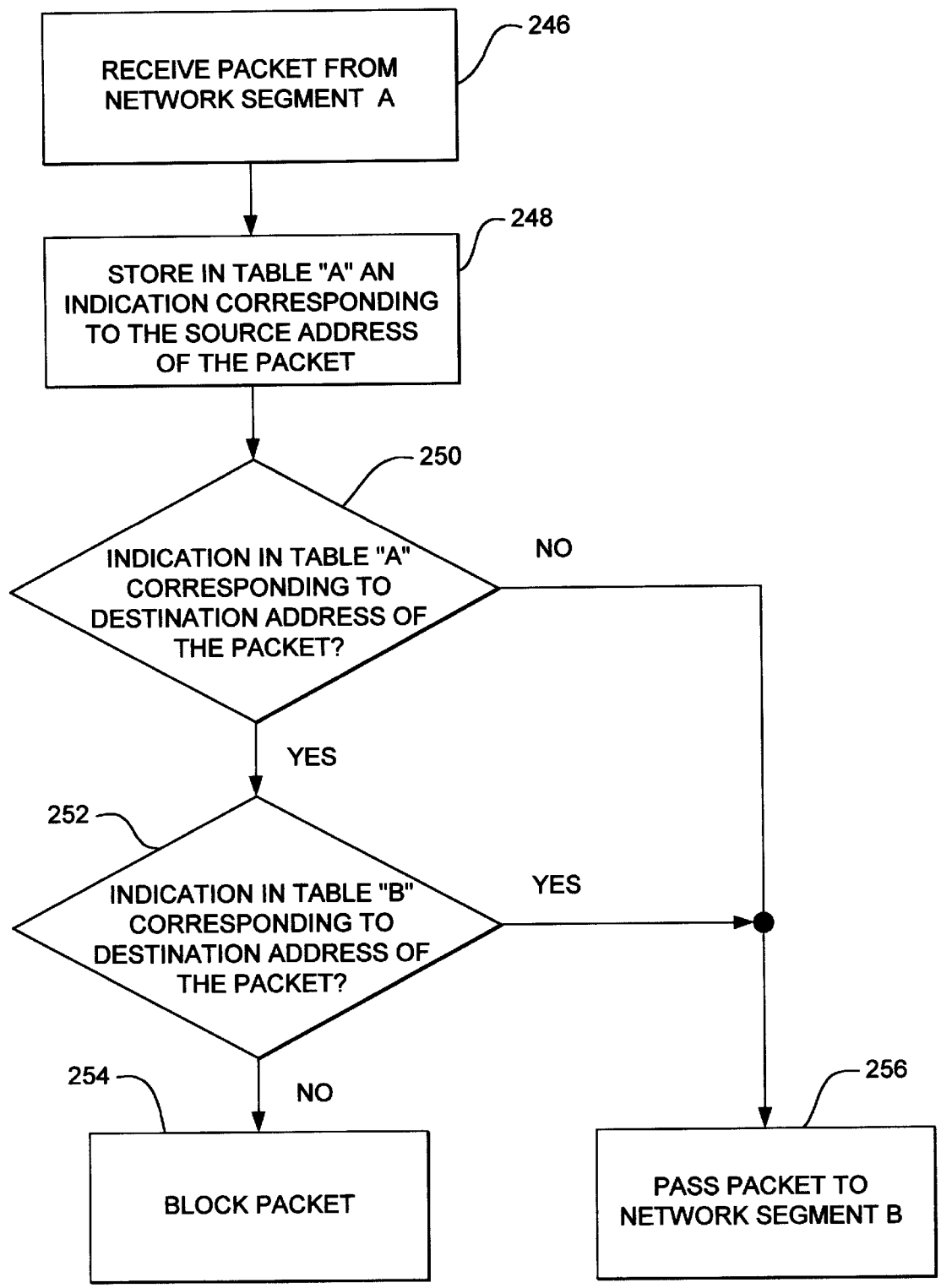
FIG. 12 is a flow chart illustrating self learning and filtering for packets from network A according to the present invention.

FIG. 12 is a flow chart illustrating self-learning and filtering for packets from network A according to the present invention. First a packet is received from segment A (step 246). In table A an indication corresponding to the source address of the packet is stored. Next table A is checked to determine whether an indication in table A exists corresponding to the destination address of the packet (step 250). If an indication in table A corresponding to the destination address to the packet does not exist, then the packet is passed to network segment B (step 256). If an indication in table A corresponding to the destination address of the packet does exist, then it is determined whether an indication in table B corresponding to the destination address of the packet exists (step 252). If an indication in table B corresponding to the destination address of the packet does exist, then the packet is passed to network segment B (step 256). If an indication in table B corresponding to the destination address of the packet does not exist, then the packet is blocked (step 254). Thus, if an indication in table A corresponding to the destination address of the packet does not exist, then table B is not checked. Otherwise table B will be checked. Table B is checked if an indication in table A corresponding to the destination address of the packet does exist in order to help account for the situation where another address in the set of addresses hashing to the same hash value has caused the indication in table A to be set.

Figure 13:
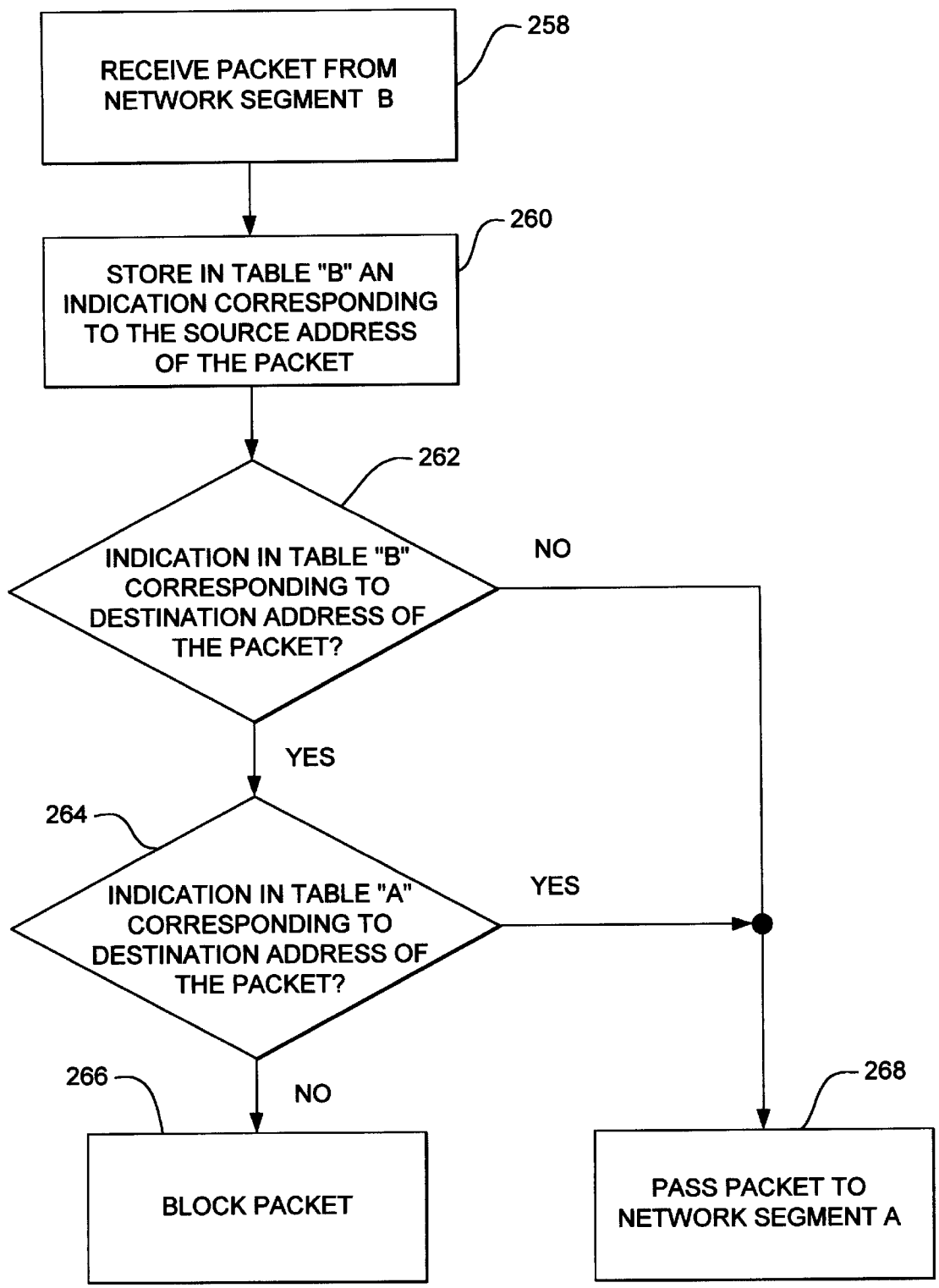
FIG. 13 is a flow chart illustrating self learning and filtering for packets from network B according to the present invention.

FIG. 13 is a flow chart illustrating self-learning and filtering for packets from network B according to the present invention. A packet is received from network segment B (step 258). An indication is stored in table A corresponding to the source address of the packet (step 260). Table B is checked to determine whether an indication corresponding to the destination address of a packet exists in table B (step 262). If an indication in table B corresponding to the destination address of the packet does not exist, then the packet is passed to network segment A (step 268). If an indication in table B corresponding to the destination address of the packet does exist, then the table A is checked to determine whether an indication corresponding to the destination address of the packet exists in table A (step 264). If an indication in table A corresponding to the destination address of the packet exists, then the packet is passed to network segment A (step 268). If an indication in table A corresponding to the destination address of the packet does not exist, the packet is blocked (step 266).

Figure 14:
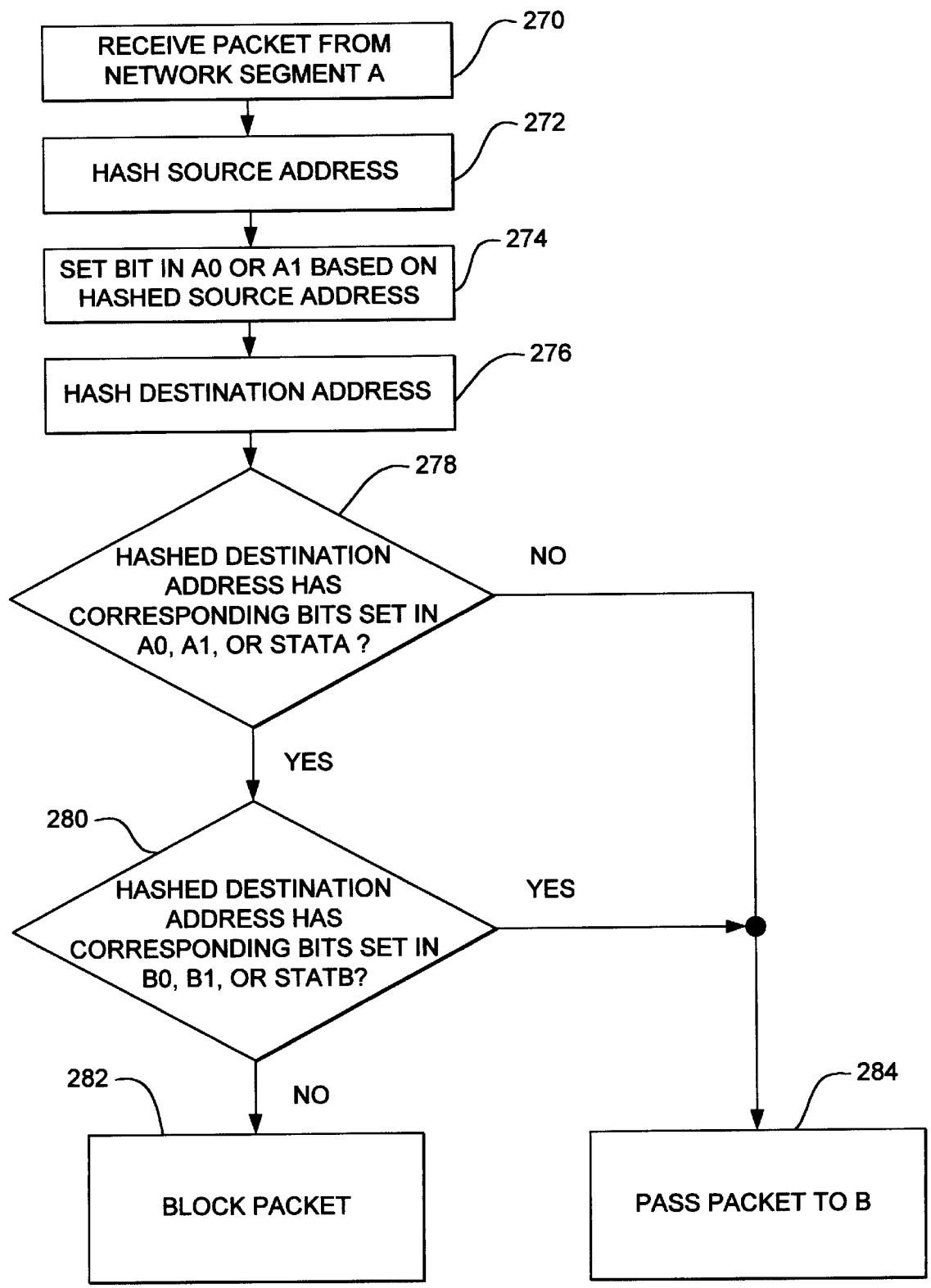
FIG. 14 is a more detailed flow chart illustrating self learning and filtering for packets from network A according to the present invention.

FIG. 14 is a more detailed flow chart illustrating self learning and filtering for packets from network segment A according to the present invention. A packet is received from side A (step 270). The source address of the packet from side A is hashed (step 272) to form a source hash value. A bit is set in table A0 or table A1 based on the source hash value (step 274). Next, the destination address is hashed to form a destination hash value (step 276). Next, tables A0, A1, and stat A are checked to determine whether any of these tables has a indication bit set corresponding to the destination hash value (step 278). If none of these tables has a bit set corresponding to the destination hash value, then the packet is passed to segment B (step 284). If at least one of the tables A0, A1, or stat A has a bit set at an entry indexed by the destination hash value, then the tables B0, B1, and stat B are checked at locations corresponding to the destination has value (step 280). If at least one corresponding bit indexed by the destination hash value is set in table B0, B1, or stat B, then the packet is passed to segment B (step 284). If no bit set indexed by the destination hash value in either B0, B1, or stat B, then the packet is blocked (step 282).

In step 274 a bit is set in either table A0 or table A1 depending on an aging timer. In this manner, table A0 and A1 allow for a set of older indications and a newer set of indications to be stored. After a determined amount of time (5 minutes), entries in the older table are erased and the newer table then becomes the older table and then new entries will be written into what was previously the older table. An aging timer is used to determine the time interval for maintaining the dynamic hash tables before being flushed. The aging timer interval is selected by adjusting pins or by programming an aging timer register on an integrated circuit embodiment of the invention. In one embodiment of the invention the minimum aging time is 5 minutes, and the maximum is 1275 minutes. Alternatively, the aging timer may be turned off so that no flushing of old entries occurs. Other embodiments of the invention having other possible aging time settings are possible.

Figure 15:
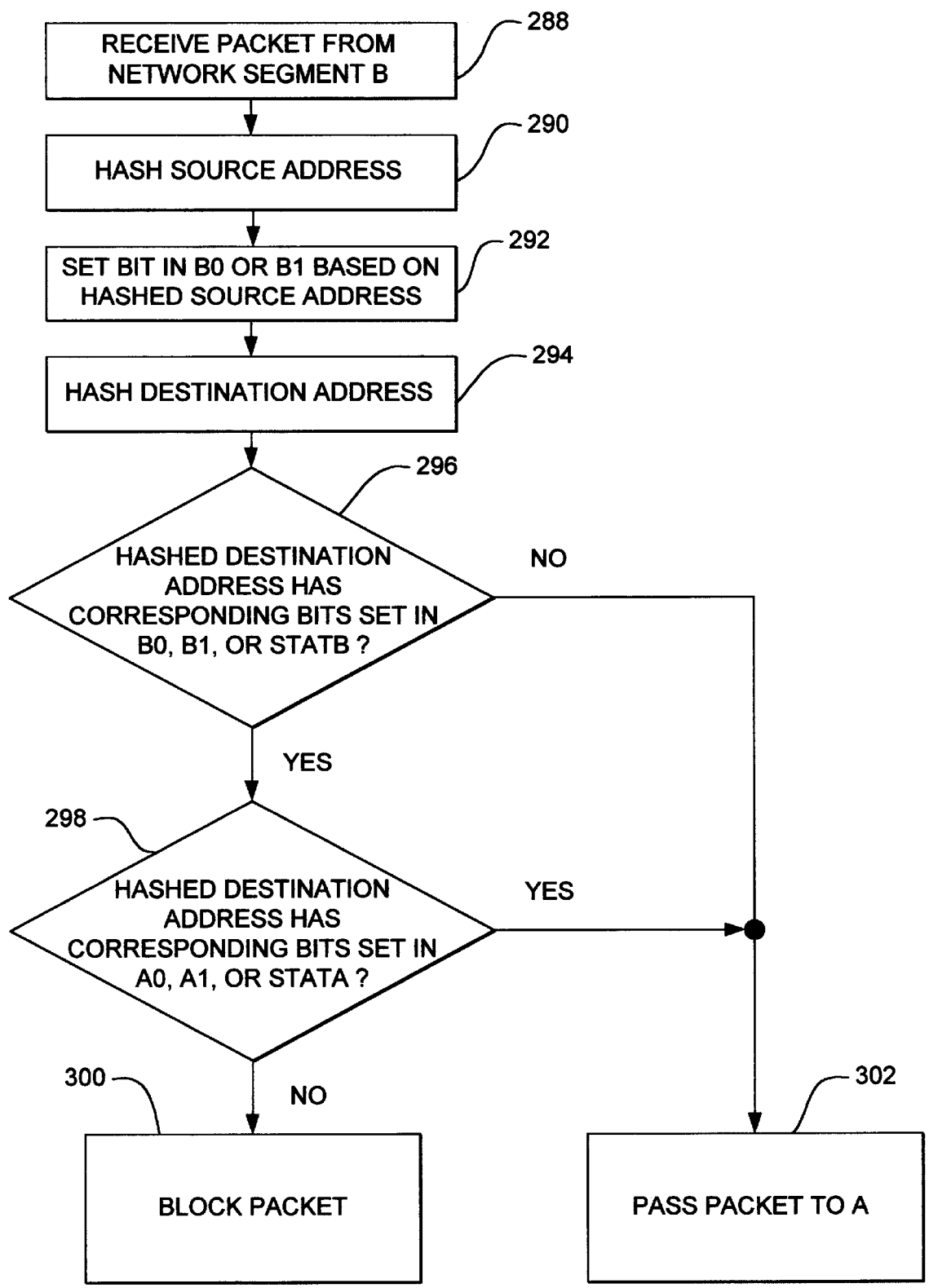
FIG. 15 is a more detailed flow chart illustrating self learning and filtering for packets from network B according to the present invention.

FIG. 15 is a more detailed flow chart illustrating self learning and filtering for packets from network B according to the present invention. A packet is received from side B (step 288). The source address of the packet from side B is hashed to form a source hash value (step 290). A bit in table B0 or table B1 is set corresponding to the source hash value obtained in step 290 (step 292). The destination address of the packet is hashed to form a destination has value (step 294). It is determined whether bits corresponding to the destination hash value exist in either table B0, table B1, or table stat B. If no corresponding indication bits indexed by the destination hash value are set in table B0, table B1, or table stat B, then the packet is passed to segment A (step 302). If a corresponding entry indexed by the destination hash value is present in table B0, table B1, or stat B, then table A0, table A1, and table stat A are checked to determine whether they contain indication bits indexed by the destination hash value (step 298). If a indication is set indexed by the destination hash value in either table A0, table A1, or stat A, then a packet is passed to segment A (step 302). If no indication indexed by the destination hash value is set in table A0, table A1, or stat A, then the packet is blocked (step 300).

Figure 16:
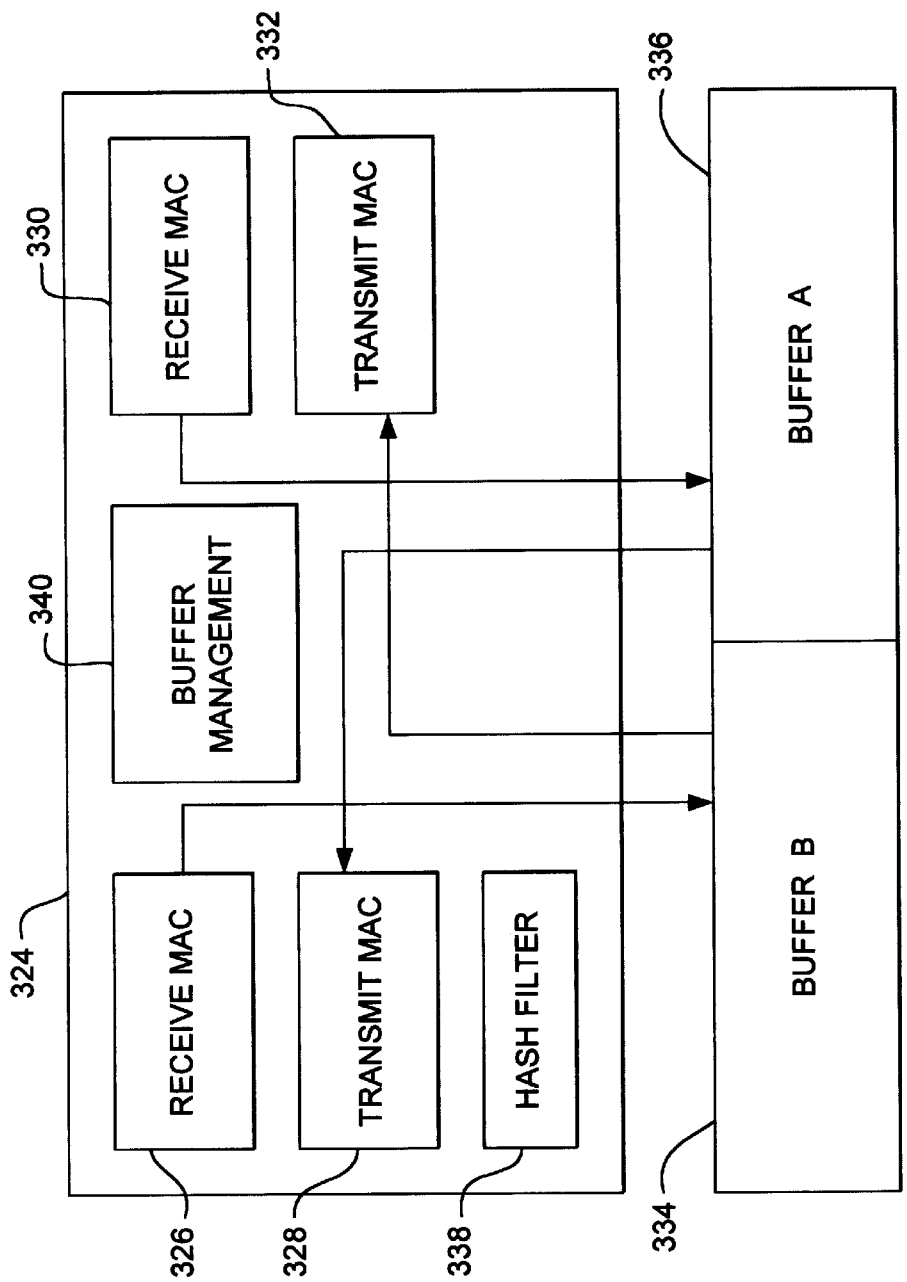
FIG. 16 is a schematic block diagram of a bridge device with medium access control (MAC) blocks according to the present invention.

FIG. 16 is a schematic block diagram of a bridge device with medium access control (MAC) blocks according to the present invention. Bridge device 324 includes receive MAC 326, transmit MAC 328, receive MAC 330, transmit MAC 332, hash filter 338, buffer management block 340, buffer B 334, and buffer A 336. Receive MAC 326 receives packets from a first network and buffers packets in buffer B 334. Transmit MAC 332 transmits packets from buffer B 334 to a second network. Receive MAC 330 receives packets from a second network and buffers those packets into buffer A 336. Transmit MAC 328 transmits packets from buffer A 336 to the first network. Hashed filter 338 controls whether a packet is passed from the first network to the second network or from the second network to the first network based on hash values of destination addresses of the packets and based on tables which store indications corresponding to addresses of packets. Buffer management 340 manages buffer B 334 and buffer A 336. The MACs are fully IEEE 802.3 compliant in half-duplex and full-duplex implementation.

Figure 17:
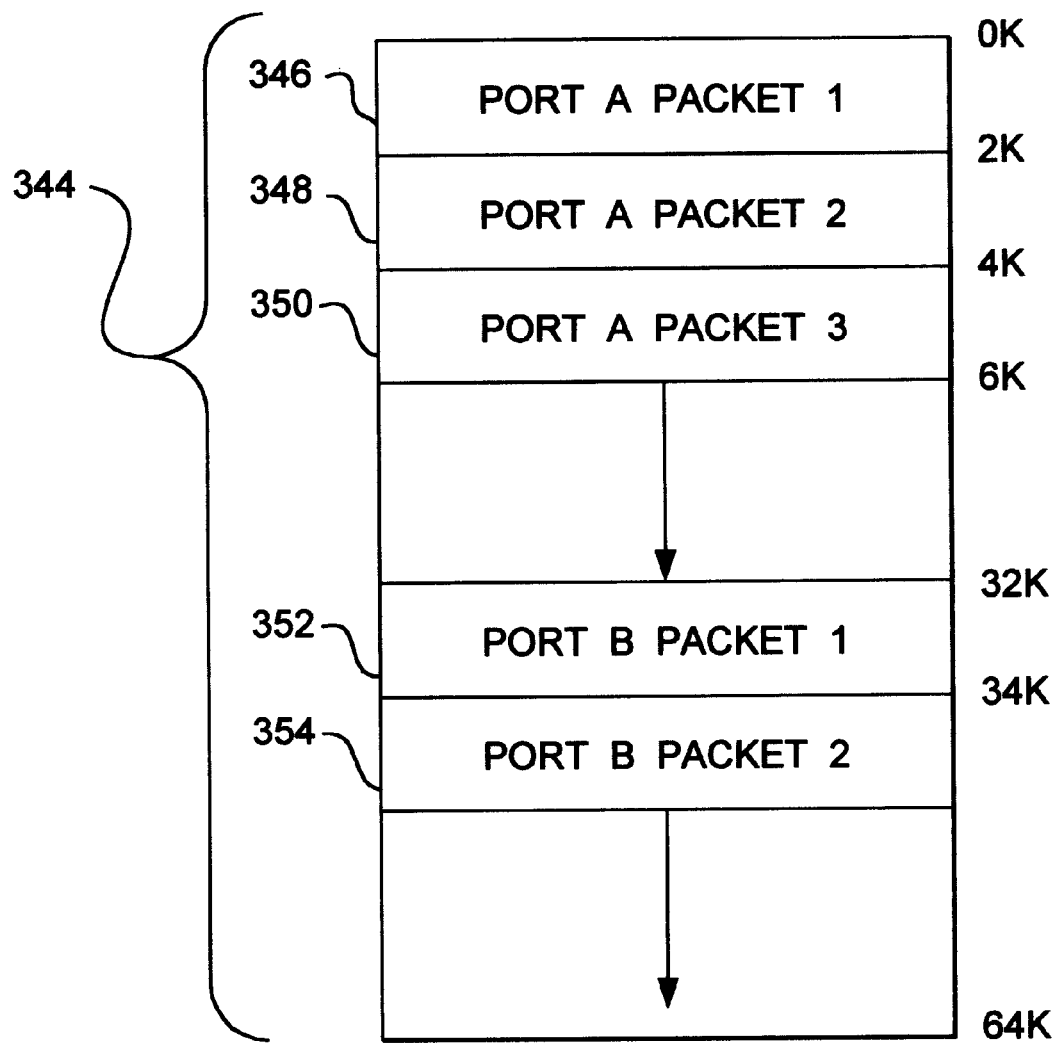
FIG. 17 is a schematic diagram of a buffer according to the present invention.

FIG. 17 is a schematic diagram of a buffer according to the present invention. Buffer 344 stores packets from network segments coupled to port A and to port B. Memory is partitioned into two sections. Section A is a receive buffer for port A; section B for port B. Buffer 344 comprises a size of 64 kilobytes. Packets from port A (packet 346, 348, 350, for example) are stored in the first 32 kilobytes of the buffer 344. Packets from network segment B (packet 352, 354, for example) are stored in the second 32 kilobytes of buffer 344. The buffers are implemented with high speed (20 nanoseconds or faster) SRAMs. A minimum of 16 Kbyte buffer memory is required, but 256 Kbyte buffer is preferred for higher performance. Size of each section is configurable through external pins. Alternatively, auto sizing can be used to allow dynamic buffer allocation once a section of a buffer is full. FIG. 18 shows the initial configuration of buffer 344 where allocation is one to one between port A and port B. The last word of each buffer is status storage. After receiving a packet, the bridge writes the packet length in the storage. A bad packet is rejected at the end and the buffer is reclaimed. After reset, both sides are selected at 100 Mps, the buffer sizes in A and B are equal. Minimum size of a packet buffer is 2 kbytes. The buffer memory has four modes:

(1) Receiving from A, transmitting to B,
(2) Receive from B, transmitting to A,
(3) Receiving from A, receiving from B,
(4) Transmitting to A, transmitting to B.

If after the whole packet is received and no more buffer space is available, a buff_full pin will be asserted for as long as there is no empty buffer. In the full duplex mode, a pause packet is sent to the other end to signal that no more buffer space is available if a flow control mechanism is enabled. The time interval of a pause timer to cause the other end to stop sending packets is determined by a serial EEPROM.

Two possible forwarding modes and two transmission protocols can be selected through a pin on the bridge device. The forwarding modes are either full-packet store and forward, or 64-byte store and forward. In the full-packet store and forward mode, packet is forwarded only after the complete packet is received and checked and an ill-formed packet will be discarded and the buffer reclaimed. In the 64-byte store and forward mode, the bridge is to transmit the receiving packet once the first 64 bytes are received without collision; however, if during the receiving, another packet is being transmitted or waiting to be transmitted, this option will not have the effect, i.e., received packet will be buffered in full. With half-duplex transmission protocol, the carriers sense multiple access with collision detect (CSMA/CD) protocol is implemented. In full-duplex and full control protocol, without collision and a carrier sense detection, transmit starts at the 64th byte location or at the end of a packet. The pause packet is received, transmission activity is suspended until the pause time expires.

Four types of physical interfaces on port A and six types of physical interfaces on Port B to accommodate different applications are provided. These inter-faces are 10/100 MII Data Interface, 100M TX/FX Interface, and 10M Serial Interface. The physical interfaces of port A and B can be selected independently through pins corresponding to the respective ports. The most commonly used 10/100 MII Data Interfaces which comprise framed 4-bit-nibble-wide synchronous data path and control signals are categorized in two groups. The MAC-MII Interface accepts data through RXD[3:0] from a PHY device and sending data through TXD [3:0], and the PHY-MII Interface accepts data through TXD[3:0] from a MAC-like or a repeater device and sending data through RXD[3:0]. The 10M MII 4-bit-nibble mode is also available by transferring data at 2.5 MHz clock rate. The 100M TX/FX Interface allows transferring information to and from the MAC or a repeater using 5-bit of unframed data with lower latency at 25 MHz clock rate. The 5-bit code-groups are undetectable and have no meaning outside the 100 BASE-X physical protocol data unit, called a "Stream". Only Port B can be configured to 10M Serial mode to transfer data with a serial data stream at 10 MHz clock rate. Two types of 10M serial modes are available; the MAC-Serial mode allows the "7-wire" interface to a 10Base-T PHY and the PHY-Serial mode allows the "7-wire" interface to a 10Base-T MAC. These interfaces are selected by setting PHY2-0_B at (1, 0, 0) for MAC-Serial mode and (1, 0, 1) for PHY-Serial mode.

The interface selections are detailed as follows:

| Physical Interface on Port A | Speed (Mb/s) |
|---|---|
| MAC-MII(Connecting to a PHY) | 10/100 |
| PHY-MII(Connecting to a MAC) | 10/100 |
| FX | 100 |
| TX | 100 |
| Physical Interface on Port B | Speed (Mb/s) |
| MAC-MII(Connecting to a PHY) | 10/100 |
| PHY-MII(Connecting to a MAC) | 10/100 |
| FX | 100 |
| TX | 100 |
| MAC-Serial(Connecting to a PHY) | 10 |
| PHY-Serial(Connecting to a MAC) | 10 |

Three types of MII Interfaces are provided: the 100 Mb/s MII Interface, the 10 Mb/s Nibble Interface, and the 10 Mb/s Serial Interface. The 10/100 Mb/s MII operates in 4-bit nibble mode at 2.5/25 MHz clock rate. To provide more flexibility for various applications, the reversed MII mode for each MII application is also implemented. For instance, the MAC-MII interface is used to connect to a PHY device, but its reversed MII, the PHY-MII Interface, is used to connect to a MAC device. The MAC-MII comprises of 15 signals where RXDV, CRS, COL, RXER, RXD[3:0] are input and TXEN, TXD[3:0] are output. In MAC-MII mode, the clock lines TXCLK and RXCLK sourced by the Physical Layer chip supply the transmit and receive clocks for the bridge device with 2.5 MHz at 10 M speed and 25 MHz clock rate at 100 M speed. On the contrary, the PHY-MII interfaces to a MAC device with RXDV, CRS, COL, RXER, RXD[3:0] as output and TXEN, TXD[3:0] as input are provided for PHY-MII interface. The TXCLK which provides clock reference for the MX98201 and the Physical Layer chip is sourced by an external 2.5/25 MHz clock; the RXCPHY is sourced by the bridge device. For 10 Mb/s serial Interface operation, the MII Data Interface is remapped to accommodate the 10 Mb/s Interface. The MAC-Serial Interface is used to provide RXD, CRS, COL as input to the bridge device and TXEN, TXD as output to a 10 Mb/s Ethernet Physical Layer. The TXCLK and RXCLK clock lines generated by the Physical Layer chip provide the 10 MHz transmit and receive clocks for the bridge device. On the other hand, the PHY-Serial Inter-face uses RXD, CRS, COL as output to a MAC device and TXEN, TXD as input. An external 10 MHz clock supplies TXCLK for the MX98201 and the MAC device; the RXCPHY is sourced by the bridge device.

Figure 18A:
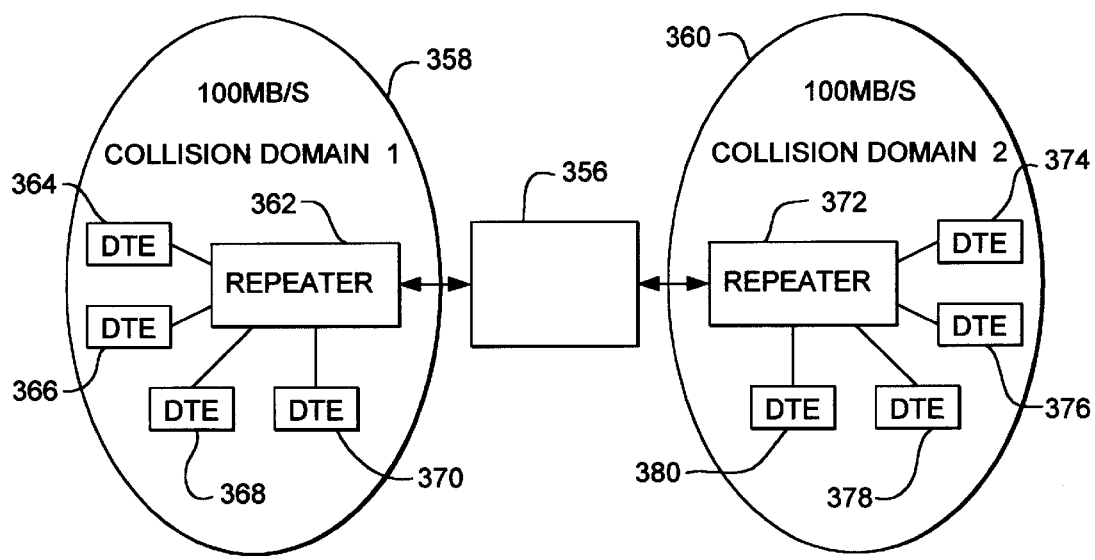
FIG. 18a is a schematic block diagram of a bridge device and two 100 Mb/s collision domains according to the present invention.

FIG. 18a is a schematic block diagram of a bridge device and two 100 Mb/s collision domains according to the present invention. The design shown in FIG. 18a uses a single bandwidth (100 Mb/s) in both collision domains. The first collision domain 358 includes a repeater 362, which is coupled to DTE 364, DTE 366, DTE 368, and DTE 370. The second collision domain 360 includes repeater 372, DTE 374, DTE 376, DTE 378, and DTE 380. The first collision domain 358 is coupled to the second collision domain 360 through bridge device 356. Bridge device is coupled to repeater 362 in the first collision domain 358 and to repeater 372 in the second collision domain 360.

Figure 18B:
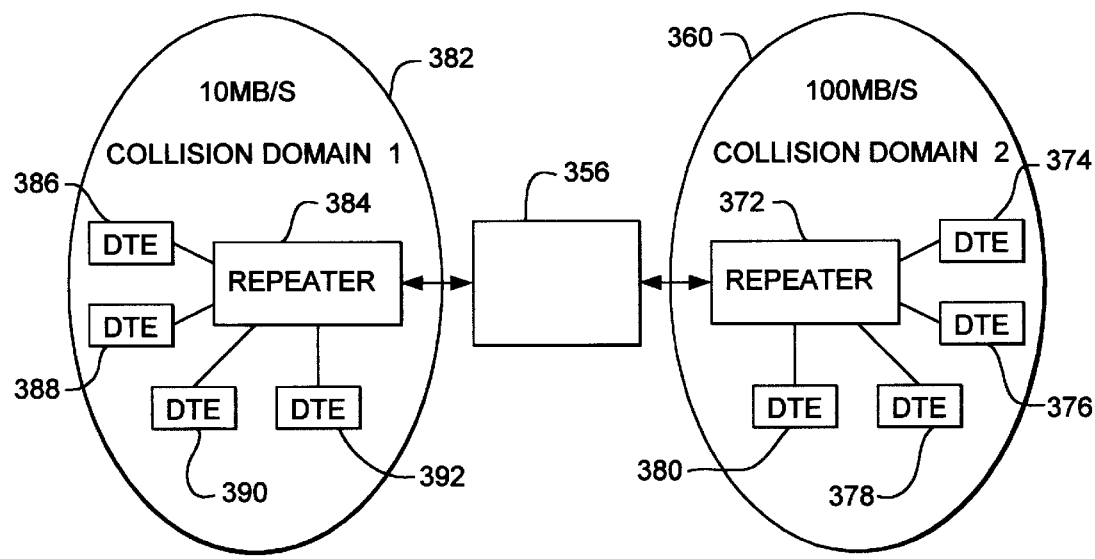
FIG. 18b is a schematic block diagram of a bridge device and one 10 Mb/s collision domain and one 100 Mb/s collision domain according to the present invention.

FIG. 18b is a schematic block diagram of a bridge device and one 10 Mb/s collision domain and one 100 Mb/s collision domain according to the present invention. The design shown in FIG. 18b uses a different bandwidth (10 Mb/s) in the first collision domain 382 as compared to the bandwidth (100 Mb/s) in the second collision domain 360. The first collision domain 382 is coupled to the second collision domain 360 through the bridge device 356. The first collision domain includes a repeater 384, which is coupled to bridge device 356, DTE 386, DTE 388, DTE 390, and DTE 392. The second collision domain includes repeater 372, which is coupled to bridge device 356, DTE 374, DTE 376, DTE 378, and DTE 380.

Figure 19:
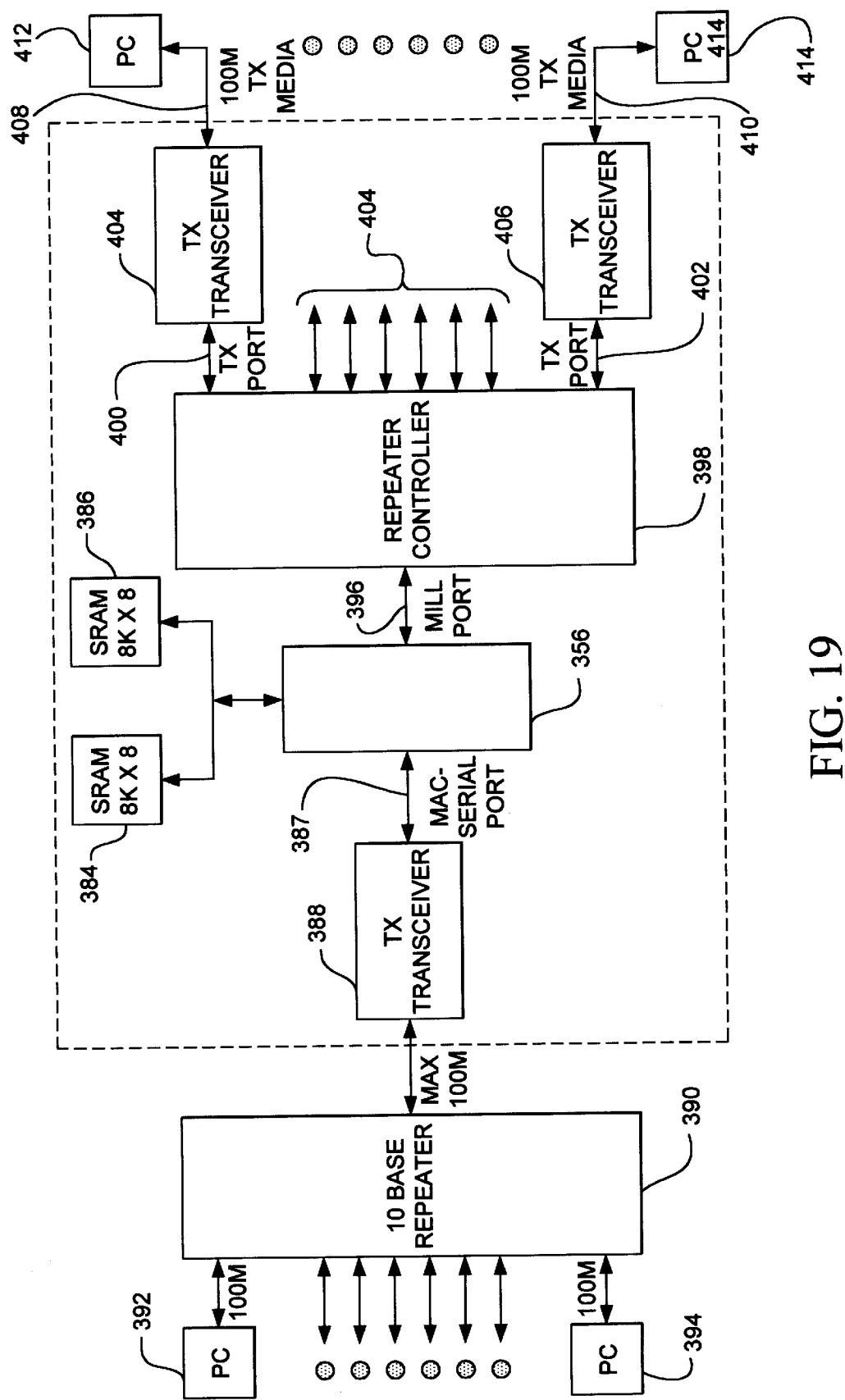
FIG. 19 is a schematic block diagram of a combined 100 Base-T system according to the present invention.

FIG. 19 is a schematic block diagram of a combined 100Base-T system according to the present invention. Such a system is built with repeaters and a bridge to deliver both 10 Mb/s and 100 Mb/s service. Bridge device 356 is coupled to SRAM 384 and SRAM 386. Bridge device 356 is coupled to TX transceiver 388 via MAC serial port 387. TX transceiver is coupled to 10 base repeater 390. 10 base repeater is coupled to PC 292 and PC 394. Bridge device 356 is coupled to repeater controller 398 via media independent interface (MII) port 396. Repeater controller 398 is coupled to TX transceiver 404 via TX port 400 and to TX transceiver 406 via TX port 402. Additional TX ports may be coupled to repeater controller 398 through ports 404. TX transceiver 404 is coupled to PC 412 via TX media 408. TX transceiver 406 is coupled to PC 414 via TX media 410.

Figure 20A:
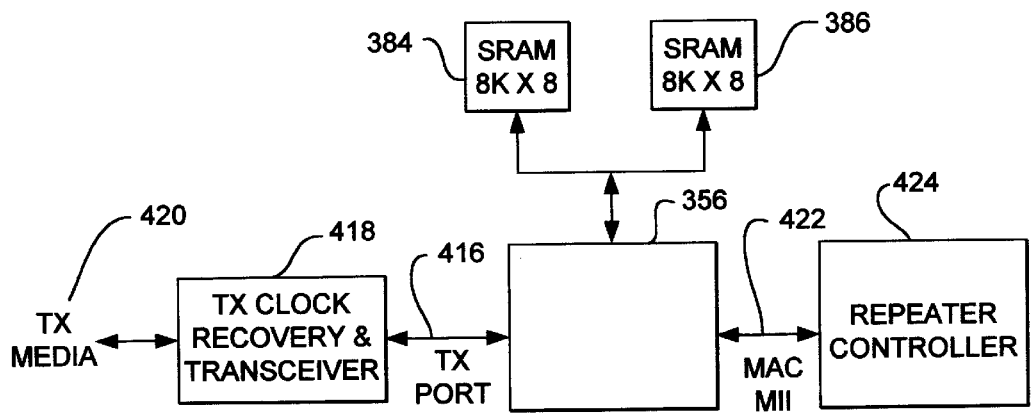
FIG. 20a is a schematic block diagram of a built-in bridge application according to the present invention.

FIG. 20a is a schematic block diagram of a built-in bridge application according to the present invention. Bridge device 356 is coupled to SRAM 384 and SRAM 386. Bridge device 356 is coupled to TX clock recovery & transceiver 418 via TX port 416. TX clock recovery & transceiver 418 is coupled to TX media 420. Bridge device 356 is coupled to repeater controller 424 via MAC MII 422. Alternatively, a PHY MII / MAC MII interface can be used instead of MAC MII 422. Also, a PHY MII interface can be used instead of MAC MII 422.

Figure 20B:
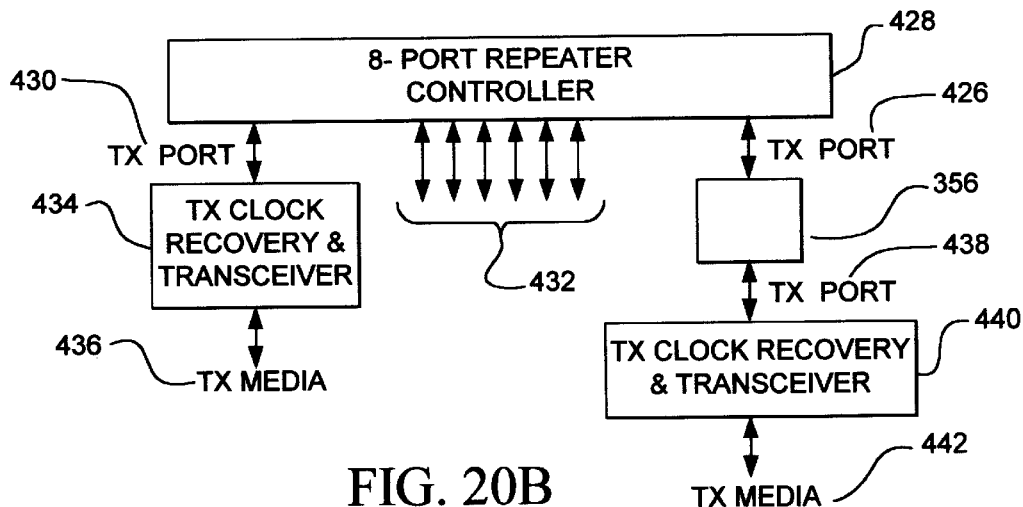
FIG. 20b is a schematic block diagram of a media independent interface (MII) repeater application according to the present invention.

FIG. 20b is a schematic block diagram of a media independent interface (MII) repeater application according to the present invention. Bridge device 356 is coupled to repeater controller 428 via TX port 426. Repeater controller 428 is coupled to TX clock recovery & transceiver 434 via TX port 430. TX clock recovery & transceiver 434 is coupled to TX media 436. Bridge device 356 is coupled to TX clock recovery & transceiver 440 via TX port 438. TX clock recovery & transceiver 440 is coupled to TX media 442. Alternatively, instead of TX port 426, a PHY-MII port may be used to couple bridge device 356 to repeater controller 428, and a MII port can be used to couple repeater controller 428 to TX clock recovery & transceiver 434.

Figure 20C:
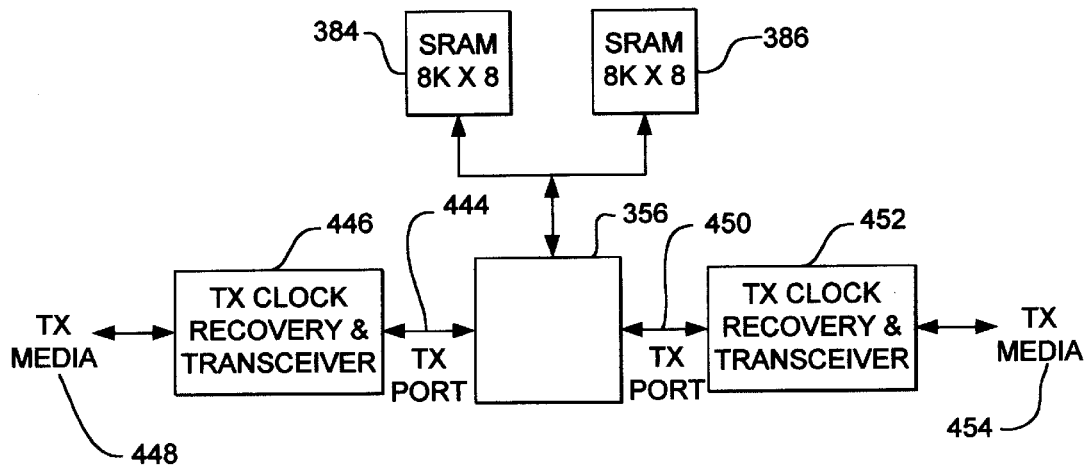
FIG. 20c is a schematic block diagram of a stand-alone bridge application according to the present invention.

FIG. 20c is a schematic block diagram of a stand-alone bridge application according to the present invention. Bridge device 356 is coupled to SRAM 384 and SRAM 386. Bridge device 356 is coupled to TX clock recovery & transceiver 446 via TX port 444. TX clock recovery & transceiver 446 is coupled to TX media 448. Bridge device 356 is coupled to TX clock recovery & transceiver 452 via TX port 450. TX clock recovery & transceiver 452 is coupled to TX media 454. Alternatively, instead of TX clock recovery & transceiver 452, bridge device 356 may be coupled to a TX clock recovery chip, and the TX clock recovery chip would then be coupled to a FX fiber transceiver and the FX fiber transceiver would be coupled to an FX media. Also, instead of using TX port 450 and TX clock recovery & transceiver 452, bridge device 356 may be coupled to a 10/100-base twisted pair transceiver via an MII port and the 10/100-base twisted pair transceiver would then be coupled to a 10-base T media.

The following are tables showing pins in an integrated circuit embodiment of the invention:

| Port A TX Symbol/Media Independent Interface | | |
|---|---|---|
| Pin Name | Type | Description |
| TDAT4_A | O | TX/FX Mode; Output. The most significant bit of the 5-bit Symbol Data. |
| TDAT3-0_A/TXD3-0_A | I/O | TX/FX Mode TDAT3-0_A: Output. These 4 pins and TDAT4_A are the 5-bit Symbol Data synchronous with TXCLK_A. MAC-MII Mode TXD3-0_A: Output. Synchronous with TXCLK_A, the 4-bit framed nibbles are used to transmit data to an external PHY device. PHY-MII Mode TXD3-0_A: Input. Synchronous with TXCLK_A, the 4-bit framed nibbles are the data transferred by an external MAC-like device. |
| TXCLK_A | I | TX/FX Mode: Input. It is a 25 MHz local symbol clock input. MII Mode: Input. It is a 2.5/25 MHz MII transmit clock input. |
| RDAT4_A | I | TX/FX Mode: Input. The most significant bit of the 5-bit Symbol Data. |
| RDAT3-0_A/RXD3-0_A | I/O | TX/FX Mode RDAT3-0_A: Input. These 4 pins and RDAT4_A are the 5-bit Symbol Data synchronous with RXCLK_A. MAC-MII Mode RXD3-0_A: Input. Synchronous with RXCLK_A, the 4-bit framed nibbles are used to receive data from an external PHY device. PHY-MII Mode RXD3-0_A: Output. Synchronous with RXCLK_A, the 4-bit framed nibbles are used to transfer data to an external MAC-like device. These pins are tri-stated if OE_A is asserted high. |
| RXCLK_A | I | TX/FX Mode: Input. The 25 MHz Receive Clock is generated by an external PHY device. MAC-MII Mode: Input. The Receive Clock |

-continued

Port A TX Symbol/Media Independent Interface

| Pin Name | Type | Description |
|---|---|---|
| | | generated by an external PHY device is 2.5/25 MHz in frequency. |
| SIGDET_A/COL_A | I/O | TX/FX Mode: Input. The Signal Detect indicates 100Base-T activity on the receive channel when asserted by an external PHY device. MAC-MII Mode: Input. The Collision signal from an external PHY device indicates that a receive carrier is detected while transmitting. PHY-MII Mode: Output. The Collision signal interfaces to an external MAC-like device, it is asserted if both the transmit and receive lines are active in half-duplex mode. The signal has no effect in full-duplex mode. |
| CRS_A | I/O | MAC-MII Mode: Input. The Carrier Sense signal is sourced by an external PHY device to indicate that either transmit or receive lines are active. PHY-MII Mode. Output. The Carrier Sense signal interfaces to an external MAC-like device. Note: In this mode, CRS_A and RXDV_A share the same driver inside the intergrated circuit. |
| OE_A | I | Output Enable. Active low. It is used to control RXD[3:0], RXDV, RXER, RXCPHY_A in PHY_MII mode for use as output for port A. |
| RXCPHY_A | O | PHY_MII Mode: Output. It is a 2.5/25 MHz clock source. This pin is tri-stated if OE_A is asserted high. |
| RXDV_A | I/O | MAC-MII Mode: Input. The Receive Data Valid signal is generated by an external PHY device; it indicates that the recovered and decoded data nibbles are on the receive data lines. PHY-MII Mode. Output. The Receive Data Valid signal indicates to the external MAC-like device that integrated circuit is sending valid data nibbles for transmission. This pin can be tri-stated by pulling OE_A high. Note: In this mode, CRS_A and RXDV_A share the same driver inside the integrated circuit. |
| RXER_A | I/O | MAC-MII Mode: Input. The Receive Error signal is generated by an external PHY device. PHY-MII Mode. Output. The Receive Error signal connects to an external MAC-like device. This pin can be tri-stated by pulling OE_A high. Note: In this mode, the integrated circuit always drives a logic zero which indicates no receive error generated from the integrated circuit. |
| TXEN_A | I/O | MAC-MII Mode. Output. The Transmit Enable indicates that the integrated circuit is sending valid data nibbles for transmission to an external PHY device. PHY-MII Mode: Input. The Transmit Enable signal denotes that the recovered and decoded data nibbles are available on data lines from an external MAC-like device. |

Port B TX Symbol/Media Independent Interface

| Pin Name | Type | Description |
|---|---|---|
| TDAT4_B | O | TX/FX Mode: Output. The most significant bit of the 5-bit Symbol Data. |
| TDAT3-0_B/TXD3-0_B | I/O | TX/FX Mode TDAT3-0_B: Output. These 4 pins and TDAT4_B are the 5-bit Symbol Data synchronous with TXCLK_B. MAC-MII Mode: TXD3-0_B: Output. Synchronous with TXCLK_B, the 4-bit framed nibbles are used to transmit data to an external PHY device. PHY-MII Mode TXD3-0_B: Input. Synchronous with TXCLK_B, the 4-bit framed nibbles are the data transferred by an external MAC-like device.<br>MAC-Serial Mode TXD0_B: Output. The serial transmit data bit which interfaces to an external PHY device. PHY-Serial Mode TXD0_B: Input. The serial data bit which interfaces to an external MAC-like device. |
| TXCLK_B | I | TX/FX Mode: Input. It is a 25 MHz local symbol clock input. MII Mode: Input. It is a |

Port A TX Symbol/Media Independent Interface

| Pin Name | Type | Description |
| --- | --- | --- |
| | | 2.5/25 MHz MII transmit clock input. MAC/PHY-MII Serial Mode: It is a 10 MHz clock for 10Base serial mode. |
| RDAT4_B | I | TX/FX Mode: Input. The most significant bit of the 5-bit Symbol Data. |
| RDAT3-0_B/RXD3-0_B | I/O | TX/FX Mode RDAT3-0_B: Input. These 4 pins and RDAT4_B are the 5-bit Symbol Data synchronous with TXCLK_B. MAC-MII Mode RXD3-0_B: Input. Synchronous with RXCLK_B; the 4-bit framed nibbles are used to receive data from an external PHY device. PHY-MII Mode RXD3-0_B: Output. Synchronous with RXCLK_B, the 4-bit framed nibbles are used to transfer data to an external PHY device. These pins are tri-stated when OE_B is asserted high. MAC-Serial Mode RXD0_B: Input. The receive serial data bit interfaces to an external PHY device. PHY-Serial Mode RXD0_B: Output. The serial data bit inter-faces to an external MAC device. |
| RXCLK_B | I | TX/FX Mode: Input. The 25 MHz Received Clock is generated by an external PHY device. MAC-MII Mode: Input. The Receive Clock generated by an external PHY device is 2.5/25 MHz in frequency. MAC-Serial Mode: Input. It is a 10 MHz Receive Clock sourced by an external PHY device. |
| SIGDET_B/COL_B | I/O | TX/FX Mode: Input. The Signal Detect indicates 100Base-T activity on the receive channel when asserted by an external PHY device. MAC-MII Mode: Input. The Collision signal from an external PHY device indicates that a receive carrier is detected while transmitting. PHY-MII Mode: Output. The Collision signal interfaces to an external MAC-like device, it is asserted if both the transmit and receive lines are active in half-duplex mode. This signal has no effect in full-duplex mode. MAC-Serial Mode: Input. The Collision signal is provided by an external PHY device. PHY-Serial Mode: Output. The Collision signal interfaces to an external MAC-like device. |
| CRS_B | I/O | MAC-MII Mode: Input. The Carrier Sense signal is sources by an external PHY device to indicate that either transmit or receive lines are active. PHY-MII Mode: Output. The Carrier Sense signal interfaces to an external MAC-like device. Note: In this mode, CRS_B and RXDV_B share the same driver inside the integrated circuit. MAC-Serial Mode: Input. The Carrier Sense signal interfaces to an external PHY device. PHY-Serial Mode: Output. This Carrier Sense signal inter-faces to an external MAC-like device. Note: In this mode, CRS_B and RXDV_B share the same driver inside the integrated circuit. |
| OE_B | I | Output Enable. Active low. It is used to control RXD[3:0], RXDV, RXER, PHYRXC_B in PHY-MII mode for use as output for port B. |
| RXCPHY_B | O | PHY-MII Mode. Output. A 2.5/25 MHz clock source. This pin is tri-stated if OE_B is asserted high. PHY-Serial Mode: Output. When interfacing to a MAC-like device (i.e. MAC-MII repeater), the RXCPHY and TXCLK of both the integrated circuit and the MAC-MII repeater are sourced by the same external 10 MHz clock. |
| RXDV_B | I/O | MAC-MII Mode: Input. The Receive Data Valid signal is generated by an external PHY device; it indicates that the recovered and decoded data nibbles are on the receive data lines. PHY-MII Mode: Output. The Receive Data Valid signal indicates to the external |

-continued

Port A TX Symbol/Media Independent Interface

| Pin Name | Type | Description |
|---|---|---|
| | | Mac-like device that the integrated circuit is sending data nibbles for transmission. This output can be tri-stated by pulling OE__B high. Note: In this mode, CRS__B and RXDV__B share the same driver inside the integrated circuit. |
| RXER_B | I/O | MAC-MII Mode: Input. The Receive Error signal is generated by an external PHY device. PHY-MII Mode. Output. The Receive Error signal connects to an external MAC device. This pin can be tri-stated by pulling OE__B high. Note: In this mode, the integrated circuit always drives a logic zero which indicates no receiver error generated from the integrated circuit. |
| TXEN_B | I/O | MAC-MII Mode: Output. The Transmit Enable indicates that the integrated circuit is sending valid data nibbles for transmission to an external PHY device. PHY-MII Mode: Input. The Transmit Enable signal denotes that the recovered and decoded data nibbles are available on data lines from an external MAC-like device. MAC-Serial Mode: Output. The Transmit Enable signal interfaces to an external PHY device. PHY-Serial Mode: Input. The Transmit Enable signal interfaces to an external MAC-like device. MAC-Serial Mode: Output. The Transmit Enable signal interfaces to an external PHY device. PHY-Serial Mode: Input. The Transmit Enable signal interfaces to an external MAC-like device. |
| Mode Configuration Pins | | |
| MSIZE1-0 | I | Memory Size. Mux'd with ABYTE1-0__B. [MSIZE1, MSIZE0] = Memory size [0, 0] = 16 Kbytes; [0, 1] = 64 Kbytes; [1, 0] = 128 Kbytes; [1, 1] = 256 Kbytes. |
| MRAT2-0 | I | Memory Ratio. These two pins define the buffer size ratio of Port A to Port B. A larger buffer at Port A means Port A is capable of receiving more packets to be forwarded to Port B. [MRAT2, MRAT0] = Port A buffer size : Port B buffer size [x, x, 0] = 1 : 1; [0, 0, 1] = 1 : 7; [0, 1, 1] = 1 : 15; [1, 0, 1] = 7; 1; [1, 1, 1 ] = 15:1. |
| AUTOSIZE | I | Auto Size. Mux'd with ABYTE2__A. When asserted high, it enables Auto-size feature of buffer memory. |
| FWD1-0_A | I | Port A Forward Mode Selection. [FWD1__A, FWD0__A] = Forward Mode [0, 0 = Half-duplex, full-packet store-and-forward; [0, 1] = Full-duplex, full-packet store-and-forward; [1, 0] = Half-duplex, 64-byte store-and-forward; [ 1, 1] = Full-duplex, 64-byte store-and-forward. |
| FWD1-0_B | I | Port B Forward Mode Selection. [FWD1__B, FWD0__B,] = Forward Mode [0, 0] = Half-duplex, full-packet store-and-forward; [0, 1] = Full-duplex, full-packet store-and-forward; [1, 0] = Half-duplex, 64-byte store-and-forward ; [ 1, 1] = Full-duplex, 64-byte store-and-forward. |
| SPEED_A | I | Port A Speed. When asserted high, 100 M speed is employed for Port A. When asserted low, 10 M speed is employed. |
| SPEED_B | I | Port B Speed. When asserted high, 100 M speed is employed for Port B. When asserted low, 10 M speed is employed. |
| PHY1-0_A | I | PHY of Port A. Mux'd with ABYTE1-0__A. [PHY1__A, PHY0__A] = [0, 0] = MAC-MII (interfacing to an external PHY device); [0, 1] = PHY-MII (interfacing to an external MAC device); [1, 0] = 100BASE-FX; [1, 1] = 100BASE-TX. |
| PHY2-0_B | I | PHY of Port B. [PHY2__B, PHY1__B, PHY0__B] = [0, 0, 0] = MAC-MII (interfacing to an external PHY device); [0, 0, 1] = PHY- |

-continued

Port A TX Symbol/Media Independent Interface

| Pin Name | Type | Description |
| --- | --- | --- |
| | | MII (interfacing to an external MAC device); [0, 1, 0] = 100 BASE-FX; [0, 1, 1] = 100BASE-TX; [1, 0, 0] = MAC-Serial (interfacing to an external PHY device); [1, 0, 1] = PHY-Serial (interfacing to an external MAC device); [1, 1, 0] = Reserved; [1, 1, 1] = Reserved. |
| FCEN_A | I | Flow Control Enable. Mux'd with Buful_A. When asserted high, it enables flow control mechanism in full-duplex mode on Port A. |
| FCEN_B | I | Flow Control Enable. Mux'd with Buful_B. When asserted high, it enables flow control mechanism in full-duplex mode on Port B. |
| Address Filter Pin | | |
| SLENF_AB | I | Mux'd with PKDT7_B. |
| BCF_AB | I | Mux'd with PKDT6_B. |
| MCF_AB | I | Mux'd with PKDT5_B. |
| SAF_AB | I | Mux'd with PKDT4_B. |
| SLENF_BA | I | Mux'd with PKDT3_B. |
| BCF_BA | I | Mux'd with PKDT2_B. |
| MCF_BA | I | Mux'd with PKDT1_B. |
| SAF_BA | I | Mux'd with PKDT0_B. |
| Buffer SRAM Interface | | |
| SA16-0 | O | SRAM Address 16-0. These 17 address inputs select one of the 128K 16-bit words in the SRAM. |
| SD15-0 | I/O | SRAM Data Input/Output Ports. These 16 bidirectional pins are used to read data from or write data into the SRAM. |
| SR_W | O | Read Not Write. When asserted high, it enables the read operation of SRAMs. When asserted low, it enables the write operation. |
| SG_ | O | Output Enable. It is an active low signal which controls outputs from SRAMs. |
| Register Interface | | |
| REGDAT[7:0] | I/O | Register Data. These are the 8-bit register data. They are tri-stated if CS_ is not asserted. |
| REGSEL[7:0] | I | Register Select. These pins are used to select internal registers. |
| CS_ | I | Chip Select. When asserted low, it enables the read or write access to the register. |
| REGR_W | I | Register Read Not Write. When asserted high, it enables read operation. When asserted low, it enables write operation. |
| EEPROM Interface Pins | | |
| EECS/NOEEPROM | I/O | EEPROM Chip Select. Output. It is asserted high during a EEPROM read cycle. NOEEPROM. Input. It should be pulled high when there is no EEPROM. |
| EESK | O | EEPROM Clock. |
| EEDI | O | EEPROM Serial Data Input. It is connected to the serial data in of the EEPROM. |
| EEDO | I | EEPROM Serial Data Output. It is connected to the serial data out of the EEPROM. |
| Address Filed Access Pins | | |
| PKTD7-0_A/AGTIM7-0 | I/O | Packet Data From Port A. Output. PKTD7 is the MSB in a byte. The order displayed is as follows: Idles-preamble-SFD (1 byte) - DA (6 bytes) - Hashed DA (1 byte) - SA (6bytes) Hashed SA (1 byte) - Data -Idles. AGTIM7-0. Input. The value of aging timer is read into the integral circuit during power-up reset. AGTIM7 is the MSB and ATIM0 is the LSB. The aging timer value is minimum 5 minutes and maximum 1275 minutes. |
| ABYTE2_A/AUTO-SIZE<br>ABYTE1_A/PHY1_A<br>ABYTE0_A/PHY0_A | I/O,TTL | Address Byte From Port A. Output. These three pins indicate the content of PKTD7-0_A. [ABYTE2, ABYTE1, ABYTE0] [0, 0, 1] = PKTD7-0_A is the SFD (10101011); [0, 0, 1] = PKTD7-0_A are the DA bytes; [0, 1, 0] = PKTD7-0_A are the Most Significant 8 bits |

-continued

Port A TX Symbol/Media Independent Interface

| Pin Name | Type | Description |
|---|---|---|
|  |  | of the CRC of the 6 DA bytes; [0, 1, 1] = PKTD7-0_A are the SA bytes; [1, 0, 0] = PKTD7-0_A are the Most Significant 8 bits of the CRC of the 6 SA bytes; [1, 0, 0] = PKTD7-0_A are the data; [1, 1, 0] = PKTD7-0_A are the Idle state; [1, 1, 1] = PKTD7-0_A are the preamble. Autosize. Input. When asserted high, it enables the auto-size feature of buffer memory. PHY1-0_A. Input. Physical interface for Port A. |
| ABORT_A | I | Abort Packet From Port A. When this pin is asserted high, it signals the integrated circuit to abort a most recently received packet. If this packet is stored in the buffer, the buffer is reclaimed. |
| PKTD7-0_B | I/O | Packet Data From Port B. Output. PKTD7 is the MSB in a byte. The order displayed is as follows: idles-preamble-SFD (1 byte) - DA (6 bytes) - Hashed DA (1 byte) - SA (6bytes) Hashed SA (1 byte) - Data - Idles. |
| SLENF_AB |  | Input, Active high signals. Self Learning Algorithm from A to B enabled. |
| BCF_AB |  | Broadcast Filter from A to B Enabled. |
| MCF_AB |  | Multicast Filter from A to B Enabled. |
| SAF_AB |  | Self-Addressed Packet Filter from A to B Enabled. |
| SLENF_BA |  | Self Learning Algorithm from B to A Enabled. |
| BCF_BA |  | Broadcast Filter from B to A Enabled. |
| MCF_BA |  | Multicast Filter from B to A Enabled. |
| SAF_BA |  | Self-Addressed Packet Filter from B to A Enabled. |
| ABYTE2_B | O | Address Byte From Port B. Output. These three pins indicate the content of PKTD7-0_B. [ABYTE2, ABYTE1, ABYTE0] [0, 0, 0] = PKTD7-0_B is SFD (10101011); [0, 0, 1] = PKTD7-0_B are DA bytes; [0, 1, 0] = PKTD7-0_B are the Most Significant 8 bits of the CRC of the 6 DA bytes; [0, 1, 1] = PKTD7-0_B are the SA bytes; [1, 0, 0] = PKTD7-0_B are the Most Significant 8 bits of the CRC of the 6 SA bytes. [1, 0, 1] = PKTD7-0_B are the data; [1, 1, 0] = PKTD7-0_B are the Idle state; [1, 1, 1] = PKTD7-0_B are the preamble. MSIZE1-0. Input. These two pins select buffer memory size. |
| ABYTE1_B/MSIZE1 | I/O |  |
| ABYTE0_B/MSIZE0 |  |  |
| ABORT_B | I | Abort Packet From Port B. When ABORT_B is asserted high, it signals the integrated circuit to abort the most recently received packet. If this packet is stored in the buffer, the buffer is reclaimed. |
| Buffer Full Indication |  |  |
| BUFUL_A/FCEN_A | I/O | Buffer Full At Port A. Output. When BUFUL_A is asserted high, it indicates that buffer is full due to the received packets on Port A. If desired, it may be used with 74LS244 to drive an LED as the Port A buffer status indication. Flow Control Enable. Input. Flow control mechanism enable pin. |
| BUFUL_B/FCEN_B | I/O | Buffer Full At Port B. Output. When BUFUL_B is asserted high, it indicates that buffer is full due to the received packets on Port B. If desired, it may be used with 74LS244 to drive an LED as the Port B buffer status indication. Flow Control Enable. Input. Flow control mechanism enable pin. |

In sum, the present invention provides a device that helps to reduce the complexity and costs associated with a bridge and helps to more efficiently provide the functionality of interconnection between network media and helps to avoid leaks of local packets to other network segments and is scalable for higher speed networks.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A device for coupling a first network medium to a second network medium, the device comprising:

a first port coupled to the first network medium;

a second port coupled to the second network medium;

a memory storing a first plurality of indications and a second plurality of indications, the indications in the first plurality of indications corresponding to respective sets of addresses and indicating whether at least one address in the respective set of addresses may be accessible through the first network medium, the indications in the second plurality of indications corresponding to respective sets of addresses and indicating whether at least one address in the respective set of addresses may be accessible through the second network medium; and a connecting circuit coupled to the first port, the second port, and the memory, the connecting circuit causing the ports to pass or block a packet from the first network to the second network, the packet having a destination address, the connecting circuit causing the ports to pass or block based on:

a first indication from the first plurality of indications, the first indication corresponding to a set of addresses including the destination address of the packet, and a second indication from the second plurality of indications, the second indication corresponding to the set of addresses including the destination address of the packet.

2. The device of claim 1, further comprising:

a first circuit that reads a source address of the packet, the first circuit setting a third indication in the first plurality of indications, the third indication corresponding to the source address of the packet.

3. The device of claim 2, further comprising:

a second circuit that reads a source address of a second packet from the second port, the second circuit setting a fourth indication in the second plurality of indications, the fourth indication corresponding to the source address of the second packet.

4. The device of claim 2, further comprising;

a central processing unit (CPU) interface coupled to the memory that allows a CPU to set indications in the memory.

5. The device of claim 2, further comprising:

an erase circuit coupled to the memory that erases old entries from the memory.

6. The device of claim 2, further comprising:

an aging timer;

an erase circuit coupled to the aging timer and the memory;

and wherein the first plurality of indications comprises:
a third plurality of indications, and
a fourth plurality of indications;

and wherein the first circuit is configured to set the third indication in the third plurality of indications or in the fourth plurality of indications based on the aging timer;

and wherein the erase circuit is configured to erase the third plurality of indications or the fourth plurality of indications based on the aging timer.

7. The device of claim 3, further comprising:

an aging timer;

an erase circuit coupled to the aging timer and the memory;

and wherein the first plurality of indications comprises:
a third plurality of indications, and
a fourth plurality of indications;

and wherein the second plurality of indications comprises:
a fifth plurality of indications, and
a sixth plurality of indications;

and wherein the first circuit is configured to set the third indication in the third plurality of indications or in the fourth plurality of indications based on the aging timer;

and wherein the second circuit is configured to set the fourth indication in the fifth plurality of indications or in the sixth plurality of indications based on the aging timer;

and wherein the erase circuit is configured to erase the third plurality of indications or the fourth plurality of indications based on the aging timer and the erase circuit is configured to erase the fifth plurality of indications or the sixth plurality of indications based on the aging timer.

8. The device of claim 1, wherein the connecting circuit is configured to block the packet from the first network segment to the second network segment if:

the first indication indicates that at least one address in the second set of addresses may be accessible through the first network medium; and the second indication does not indicate that at least one address in the fourth set of addresses may be accessible through the second network medium.

9. The device of claim 1, wherein the connecting circuit is configured to pass the packet from the first network segment to the second network segment if the second indication indicates that the destination address of the packet may be accessible through the second network segment.

10. The device of claim 1, further comprising:

an index generation circuit that generates a first index in response to the destination address of the packet; and a selector circuit that selects the first indication from the first plurality of indications based on the first index, the selector circuit coupled to the connecting circuit and to the index generation circuit.

11. The device of claim 10, wherein the index generation circuit comprises:

a hash circuit and wherein the first index comprises a result of a hash function of the destination address of the packet.

12. The device of claim 11, wherein the hash circuit comprises:

a cyclic redundancy check (CRC) circuit.

13. The device of claim 1, wherein the respective sets of addresses comprise medium access control (MAC) addresses.

14. The device of claim 1, wherein the first network medium comprises a network using carrier sense multiple access protocol.

15. The device of claim 1, wherein the first network medium comprises a collision domain network segment.

16. The device of claim 1, wherein the entire device is implemented on a single integrated circuit.

17. A medium access control (MAC) layer device for coupling a first network medium to a second network medium, the device comprising:

a first port coupled to the first network medium;

a second port coupled to the second network medium;

a memory having a first table and a second table;

first circuitry that monitors first packets from the first port and sets entries in the first table in response to the first packets, the entries in the first table indexed based on source addresses of the first packets from the first port, at least one entry in the first table mapping to more than one address;

second circuitry that monitors second packets from the second port and sets entries in the second table in response to the second packets, the entries in the second table indexed based on source addresses of the second packets from the second port;

third circuitry that selects a first entry from the first table and a second entry from the second table based on a destination address of a first packet from the first port and passes the first packet from the first port to the second port if:
the first entry is not set, or
both the first entry and the second entry are set; and wherein the source addresses of first packets from the first port comprise MAC addresses, and the source addresses of second packets from the second port comprise MAC addresses.

18. The device of claim 17, wherein the first circuitry further comprises:

a first hash circuit that hashes source addresses of the first packets to obtain first hash values; and and indexing circuit coupled to the first hash circuit that indexes the entries in the first table based on the first hash values.

19. The device of claim 18, wherein the second circuitry further comprises:

a second hash circuit that hashes the source addresses of second packets to obtain second hash values; and an indexing circuit that indexes the entries in the second table based on the second hash values; and wherein the third circuitry further comprises:
a third hash circuit that hashes the destination addresses of first packets to obtain third hash values; and
a selector circuit that selects the entries from the first table and the entries from the second the second table based on the third hash values.

20. The device of claim 18, wherein the first hash circuit is configured to create an eight bit hash value;

wherein the first hash values comprise eight bit values;

wherein the first table comprises at least 256 entries; and wherein the second table comprises at least 256 entries.

21. The device of 18, wherein the first hash circuit is configured to create an eight bit hash value;

wherein the first hash values comprise eight bit values;

wherein the first table comprises 256 or fewer entries; and wherein the second table comprises 256 or fewer entries.

22. The device of claim 20, wherein the memory comprises a plurality of flip-flops and each flop stores an entry.

23. The device of claim 19, further comprising an aging timer and an erase circuit coupled to the first table and the second table, the erase circuit erasing old values in the first table and the second table based on the aging timer.

24. The device of claim 20, further comprising a central processing unit (CPU) interface coupled to the first table and the second table that allows a CPU to set entries in the first table and the second table.

25. The device of claim 17, wherein the first network medium comprises a carrier sense with multiple access protocol network; and wherein the second network medium comprises a carrier sense with multiple access protocol network.

26. The device of claim 17, wherein the entire device is implemented on a single integrated circuit.

27. A bridge for coupling a first network segment to a second network segment, the bridge comprising:

hash circuitry coupled to the first network segment and the second network segment that hashes an address to create a hash value;

a memory coupled to the hash circuitry for storing indications indexed by hash values, the memory including a first hash table and a second hash table; and a first circuit coupled to the hash circuitry, the first hash table, and the second hash table, the first circuit:
setting a first indication in the first hash table in response to a first packet from the first network segment, the first indication indexed by a first hash value of a source address of the first packet,
setting a second indication in the second hash table in response to a second packet from the second network segment, the second indication indexed by a second hash value of a source address of the second packet, and
selecting a third indication from the first hash table based on a hash value of a destination address of the third packet and selecting a fourth indication from the second hash table based on a hash value of the destination address of the third packet, and the first circuit causing the third packet to be blocked or passed from the first network segment to the second network segment based on the third indication and the fourth indication.

28. The bridge of claim 27, wherein the third circuit is configured to determine to cause the third packet to be blocked from passing from the first network segment to the second network segment if:

the first indication is set; and the second indication is not set.

29. The bridge of claim 27, wherein the source address of a first packet from the first network segment comprises six bytes;

the destination address of the third packet comprises six bytes; and the first hash value comprises eight bits.

30. The bridge of claim 27, wherein the first indication has a first state indicating that an address hashing into the first indication is accessible through the corresponding network medium and a second state indicating that an address hashing into the first indication may not be accessible through the corresponding network medium.

31. The bridge of claim 27, wherein the first table comprises a plurality of flip-flops, and wherein each flip-flop is associated with a respective hash value.

32. The bridge of claim 27, further comprising:

an aging timer;

an erase circuit coupled to the aging timer and the memory;

and wherein the first hash table comprises:
a first subtable, and
a second subtable;

and wherein the first circuit is configured to set indications in the first subtable or the second subtable based on the aging timer;

and wherein the erase circuit is configured to erase the first subtable or the second subtable based on the aging timer.

33. The bridge of claim 27, further comprising:
a CPU interface coupled to the memory for allowing a CPU to set indications in the first table and in the second table.

34. The bridge of claim 27,
wherein the first network segment comprises a carrier sense multiple access with collision detect network; and
wherein the second network segment comprises a carrier sense multiple access with collision detect network.

35. The bridge of claim 27,
wherein the first network segment comprises a network having a bandwidth of at least 100 megabits per second.

36. The bridge of claim 27,
wherein the first network segment comprises a network having a bandwidth of at least 100 megabits per second; and
wherein the second network segment comprises a network having a bandwidth of at least 100 megabits per second.

37. The bridge of claim 27, further comprising:
a first buffer coupled to the first network segment for storing incoming packets from the first network segment.

38. The bridge of claim 36, wherein the first buffer comprises a static random access memory having an access speed sufficient to accomodate 50 megabyte per second traffic.

39. The bridge of claim 27, wherein the bridge is configured to transmit the third packet after 64 bytes of the first packet are received by the bridge if no collision occurs when the 64 bytes are received and no other packet is being transmitted or waiting to be transmitted.

40. The bridge of claim 27,
wherein the source address of the first packet from the first network segment comprises a medium access control address;
wherein the source address of the second packet from the second network segment comprises a medium access control address; and
wherein the destination address of a third packet from the first network segment comprises a medium access control address.

41. The bridge of claim 27, wherein the entire device is implemented on a single integrated circuit.

42. A method of selectively passing packets from a first network medium to a second network medium, the method comprising the steps of:
passing or blocking a first packet from the first network segment to the second network segment based on a first indication and a second indication;
wherein the first indication corresponds to a destination address of the first packet and indicates whether an address in a first set of address including the destination address may be accessible through the first network medium; and
wherein the second indication corresponds to the destination address of the first packet and indicates whether an address in a second set of addresses including the destination address may be accessible through the second network medium.

43. The method of claim 42, wherein the step of passing or blocking a first packet from the first network segment based on a first indication and a second indication further comprises:

passing the first packet from the first network segment to the second network segment if the second indication indicates that an address in the second set of addresses may be accessible through the second network medium.

44. The method of claim 42, wherein the step of passing or blocking a first packet from the first network segment based on a first indication and a second indication further comprises:
blocking the first packet from the first network segment to the second network segment if:
the first indication indicates that an address in the first set of addresses may be accessible through the first network medium; and
blocking the first packet from the first network segment to the second network segment if the second indication does not indicate that the address in the second set of addresses may be accessible through the second network medium.

45. The method of claim 42, further comprising the steps of:
performing a hash function on the address of the node in the first network segment to yield a first hash value; and
indexing the first indication by the first hash value.

46. The method of claim 45, wherein the step of performing a hash function comprises performing a cyclic redundancy check on the address of the node in the first network segment.

47. A network comprising:
a first network medium comprising a first plurality of interconnected network nodes;
a second network medium comprising a second plurality of interconnected network nodes; and
a medium access control (MAC) layer device for coupling a first network medium to a second network medium, the device comprising:
a first port coupled to the first network medium;
a second port coupled to the second network medium;
a memory having a first table and a second table;
first circuitry that monitors first packets from the first port and sets entries in the first table in response to the first packets, the entries in the first table indexed based on source addresses of the first packets from the first port, at least one entry in the first table mapping to more than one address;
second circuitry that monitors second packets from the second port and sets entries in the second table in response to the second packets, the entries in the second table indexed based on source addresses of the second packets from the second port;
third circuitry that selects a first entry from the first table and a second entry from the second table based on a destination address of a first packet from the first port and passes the first packet from the first port to the second port if:
the first entry is not set, or
both the first entry and the second entry are set; and
wherein the source addresses of first packets from the first port comprise MAC addresses, and the source addresses of second packets from the second port comprise MAC addresses.

48. The network of claim 47, wherein the entire medium access control (MAC) layer device is implemented on a single integrated circuit.

49. A bridge for coupling segments of a network, the bridge comprising:

a first port for receiving packets from a first network segment and for sending packets to a second network segment;

a first learning hash circuit coupled to the first port for hashing a first six-byte source address of the first packet to create a first eight-bit source hash value;

a first active dynamic hash table coupled to the first learning hash circuit for storing an active bit at an entry indexed by the first eight-bit source hash value;

a first history dynamic hash table coupled to the first learning hash circuit for storing a second active bit indexed by a first old eight-bit source hash value;

a first switch coupled to the first active dynamic hash table and the first history dynamic hash table and the first learning hash circuit, the first switch coupling the first active dynamic hash table or the first history dynamic hash table to the first learning hash circuit at any one point in time;

a first timer coupled to the first switch, the timer configured to cause the first switch to change from the first active dynamic hash table to the first history dynamic hash table every five minutes;

a CPU interface circuit for coupling the bridge to a CPU;

a first static hash table coupled to the CPU interface circuit, the first static hash table having a series of bits, each bit indexed by a static hash value of a node on the first network segment;

a second port for receiving packets from the second network segment and for sending packets to the first network segment;

a second learning hash circuit coupled to the second port for hashing a second six-byte source address of the second packet to create a second eight-bit source hash value;

a second active dynamic hash table coupled to the second learning hash circuit for storing an active bit at an entry indexed by the second eight-bit source hash value;

a second history dynamic hash table coupled to the second learning hash circuit for storing a second active bit indexed by a second old eight-bit source hash value;

a second switch coupled to the second active dynamic hash table and the second history dynamic hash table and the second learning hash circuit, the second switch coupling the second active dynamic hash table or the second history dynamic hash table to the second learning hash circuit at any one point in time;

a second timer coupled to the second switch, the timer configured to cause the second switch to change from the second active dynamic hash table to the second history dynamic hash table every five minutes;

a second static hash table coupled to the CPU interface circuit, the second static hash table having a series of bits, each bit indexed by a static hash value of a node on the second network segment;

a first reading hash circuit coupled to the first port for hashing a first six-byte destination address of the first packet to create a first eight-bit destination hash value, the first reading circuit coupled to the first active dynamic hash table, the first history dynamic hash table, the first static hash table, the second active dynamic hash table, the second history dynamic hash table, and the second static hash table to cause respective tables to output entries corresponding to the first eight-bit destination hash value;

a first decision circuit comprising,
a first OR gate having an output, a first input, a second input, and a third input, the first input of the first OR gate coupled to the first active dynamic hash table, the second input of the first OR gate coupled to the first history dynamic hash table, and the third input of the first OR gate coupled to the first static hash table;

a second OR gate having an output, a first input, a second input, and a third input, the first input of the second OR gate coupled to the second active dynamic hash table, the second input of the second OR gate coupled to the second history dynamic hash table, and the third input of the second OR gate coupled to the second static hash table;

an inverter having an input and an output, the input of the inverter coupled to the output of the second OR gate; and a NAND gate having a first input, a second input, and an output, the first input of the NAND gate coupled to the output of the first OR gate, the second input of the NAND gate coupled to the output of the inverter, the output of the NAND gate forming an output of the first decision circuit;

a first pass-through switch coupled to the first port and the second port, the first pass-through switch configured to allow packets to pass from the first port to the second port when the output of the decision circuit is active.

* * * * *